US012684228B2

(12) United States Patent
Pan et al.

(10) Patent No.: US 12,684,228 B2
(45) Date of Patent: Jul. 14, 2026

(54) IMAGE SHOOTING AND SHARING METHOD AND ELECTRONIC DEVICE

(71) Applicant: Huawei Technologies Co., Ltd., Shenzhen (CN)

(72) Inventors: Huajie Pan, Shenzhen (CN); He Huang, Beijing (CN); Yunfei Le, Nanjing (CN); Kailing Qin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 18/715,306

(22) PCT Filed: Sep. 12, 2023

(86) PCT No.: PCT/CN2023/118323
§ 371 (c)(1),
(2) Date: May 31, 2024

(87) PCT Pub. No.: WO2024/067073
PCT Pub. Date: Apr. 4, 2024

(65) Prior Publication Data
US 2025/0039540 A1 Jan. 30, 2025

(30) Foreign Application Priority Data
Sep. 28, 2022 (CN) .......................... 202211193921.5

(51) Int. Cl.
H04N 23/60 (2023.01)
G01C 21/36 (2006.01)
(Continued)

(52) U.S. Cl.
CPC ......... H04N 23/64 (2023.01); G01C 21/3679 (2013.01); H04N 23/61 (2023.01); H04N 23/632 (2023.01)

(58) Field of Classification Search
CPC ...... H04N 23/64; H04N 23/61; H04N 23/632; H04N 1/00127; H04N 1/00161;
(Continued)

(56) References Cited

U.S. PATENT DOCUMENTS

2013/0194438 A1* 8/2013 Sweet, III .............. G06V 40/16
348/207.1
2013/0198176 A1 8/2013 Kim
(Continued)

FOREIGN PATENT DOCUMENTS

CN 110019599 A 7/2019
CN 113454979 A 9/2021
(Continued)

*Primary Examiner* — Ahmed A Berhan
(74) *Attorney, Agent, or Firm* — Conley Rose, P.C.

(57) ABSTRACT

An image shooting and sharing method includes that an electronic device displays a shooting preview interface in response to a first operation of a user, where the shooting preview interface includes information about a target point of interest, and the target point of interest is a point of interest corresponding to a current location of the electronic device. In response to a second operation of the user, the electronic device obtains a target image through shooting, where image information of the target image includes a part or all of the information about the target point of interest. The electronic device shares the target image on an associated interface of the target point of interest in a target application after a third operation of the user.

20 Claims, 24 Drawing Sheets

(51) Int. Cl.

| | | |
|---|---|---|
| *G06F 16/587* | (2019.01) | |
| *H04N 23/61* | (2023.01) | |
| *H04N 23/62* | (2023.01) | |
| *H04N 23/63* | (2023.01) | |

(58) Field of Classification Search

CPC ........... H04N 1/00164; H04N 1/00183; H04N 23/62; H04N 23/63; H04N 23/631; H04N 23/633; H04N 23/634; H04N 23/60; G01C 21/3679; G06F 16/587

See application file for complete search history.

(56) References Cited

U.S. PATENT DOCUMENTS

| | | | |
|---|---|---|---|
| 2016/0142625 A1* | 5/2016 | Weksler | G06T 7/0002 |
| | | | 348/222.1 |
| 2017/0208246 A1 | 7/2017 | Kimura et al. | |
| 2020/0259994 A1 | 8/2020 | Yu | |

FOREIGN PATENT DOCUMENTS

| | | | |
|---|---|---|---|
| EP | 3279763 A1 | 2/2018 | |
| EP | 3905661 A1 | 11/2021 | |
| EP | 3952285 A1 | 2/2022 | |

* cited by examiner

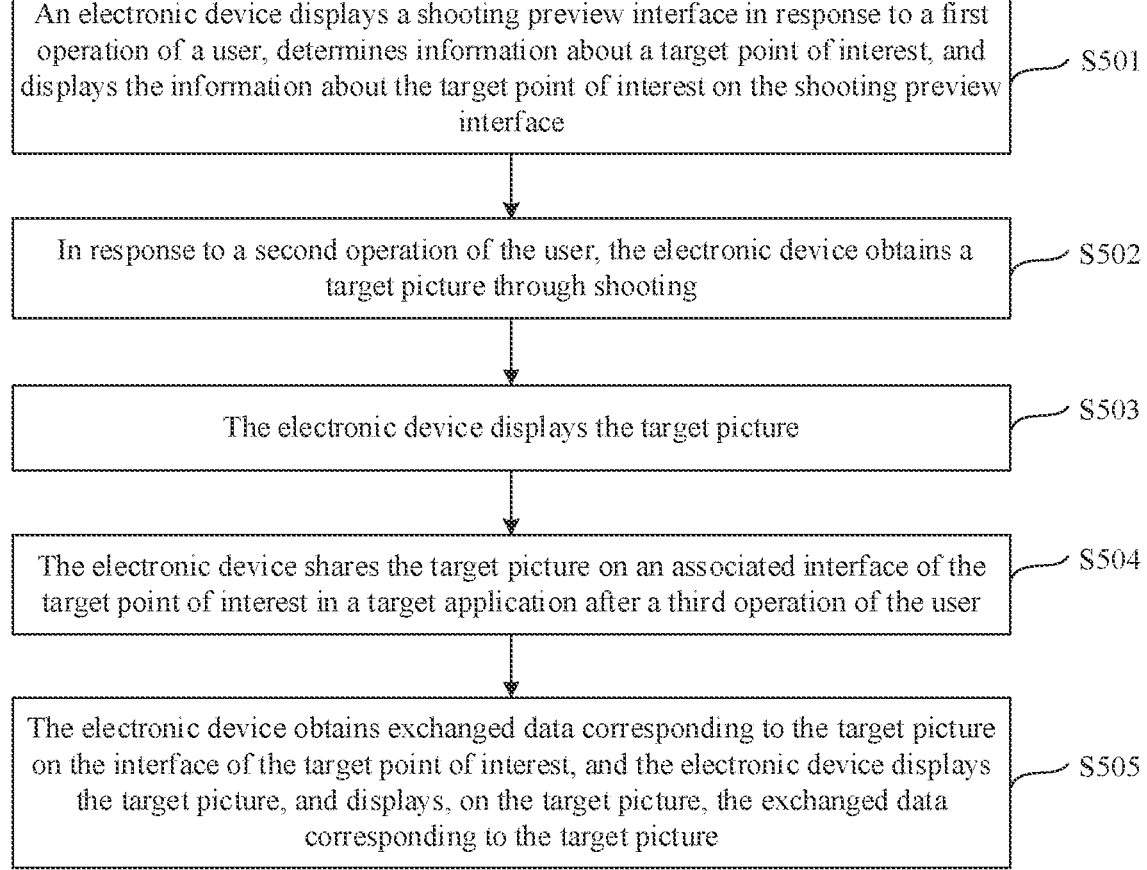

An electronic device displays a shooting preview interface in response to a first operation of a user, determines information about a target point of interest, and displays the information about the target point of interest on the shooting preview interface                                                                                    S501

In response to a second operation of the user, the electronic device obtains a target picture through shooting                                                                        S502

The electronic device displays the target picture                                            S503

The electronic device shares the target picture on an associated interface of the target point of interest in a target application after a third operation of the user        S504

The electronic device obtains exchanged data corresponding to the target picture on the interface of the target point of interest, and the electronic device displays the target picture, and displays, on the target picture, the exchanged data corresponding to the target picture                                                            S505

CONT.
FROM

~

~
TO

CONT. FROM FIG. 13B
~

IMAGE SHOOTING AND SHARING METHOD AND ELECTRONIC DEVICE

CROSS-REFERENCE TO RELATED APPLICATIONS

This application is a U.S. National Stage of International Patent Application No. PCT/CN2023/118323 filed on Sep. 12, 2023, which claims priority to Chinese Patent Application No. 202211193921.5 filed on Sep. 28, 2022, both of which are hereby incorporated by reference in their entireties.

TECHNICAL FIELD

This application relates to the field of terminal technologies, and in particular, to an image shooting and sharing method and an electronic device.

BACKGROUND

An album application of an electronic device may store an image obtained by the electronic device through shooting, or may store an image downloaded by a user to the electronic device locally. When displaying an image, the electronic device may simultaneously display image information of the image, such as a shooting time, a shooting location, a shooting focal length, and image resolution. The shooting location in the image information is generally a broad administrative division location, for example, a street in a district of a city. The information is an attribute of the image or a shooting parameter of a camera, and it is difficult for the user to obtain information related to image content from the image information. Therefore, current content of the image information is simple and lacks interaction with the user.

SUMMARY

This application provides an image shooting and sharing method and an electronic device, to provide a quick image sharing manner, and enrich image information, so as to improve user experience.

According to a first aspect, this application provides an image shooting and sharing method. The method may be performed by an electronic device. In the method, the electronic device displays a shooting preview interface in response to a first operation of a user, where the shooting preview interface includes information about a target point of interest, and the target point of interest is a point of interest corresponding to a current location of the electronic device. In response to a second operation of the user, the electronic device obtains a target image through shooting, where image information of the target image includes a part or all of the information about the target point of interest. The electronic device shares the target image on an associated interface of the target point of interest in a target application after a third operation of the user.

Based on the method, when the user uses the electronic device to shoot an image, the electronic device may obtain the target point of interest corresponding to the current location, and obtain the target image through shooting. The image information of the target image may include the information about the target point of interest, to enrich the image information and provide the user with point of interest information easily perceived. In addition, when displaying the target image, the electronic device may further support the user in sharing the target image on the associated interface of the target point of interest in the target application, to provide a convenient image sharing manner, and reduce operation steps of the user, so as to improve user experience.

In a possible design, before the displaying a shooting preview interface, the method further includes: obtaining the current location of the electronic device, and determining the target point of interest based on the current location of the electronic device and a preset correspondence between a location and a point of interest; or obtaining an image captured by a camera of the electronic device at the current location, and performing image recognition on the image, to determine the target point of interest.

According to this design, the electronic device can determine the target point of interest based on the current location. Because the point of interest is related to a geographical location, it can be ensured that the electronic device can accurately determine the target point of interest. Alternatively, the electronic device can capture an image of a current scenario, and determine the target point of interest by recognizing the current scenario, to flexibly detect the target point of interest.

In a possible design, the information about the target point of interest includes at least one of a name of the target point of interest, a location of the target point of interest, a direction of the target point of interest relative to the current location of the electronic device, a distance between the target point of interest and the current location of the electronic device, a point of interest type of the target point of interest, contact information of the target point of interest, and image content of the target point of interest.

According to this design, the electronic device may obtain a plurality of types of information related to the target point of interest, to enrich the image information of the target image, and provide more intuitive information for the user, so as to improve user experience.

In a possible design, before the third operation of the user, the method further includes: determining that the target image includes sensitive information; and displaying a first notification message, where the first notification message is used for querying the user whether to share the target image with the target application.

According to this design, when determining that the target image includes the sensitive information, the electronic device may query the user whether to share the target image, to ensure image sharing security and prevent leakage of sensitive information of the user.

In a possible design, the sharing the target image on an associated interface of the target point of interest in a target application after a third operation of the user includes: in response to the third operation of the user, displaying the associated interface of the target point of interest; in response to a fourth operation of the user, displaying a sharing editing interface corresponding to the associated interface of the target point of interest; and in response to a fifth operation of the user, sharing the target image on the associated interface of the target point of interest; or in response to the third operation of the user, displaying a sharing editing interface corresponding to the associated interface of the target point of interest; and in response to a fifth operation of the user, sharing the target image on the associated interface of the target point of interest.

According to this design, after the third operation of the user, the electronic device may jump to display the associated interface of the target point of interest in the target application, and the user can operate to share the target image on the interface, or the electronic device may directly jump to display the sharing editing interface corresponding to the associated interface of the target point of interest, to help the user directly edit comment information and share the target image.

In a possible design, the associated interface of the target point of interest includes at least one piece of comment information that is associated with the target point of interest and that is shared by the user, and the comment information includes the target image.

According to this design, after the electronic device shares the target image on the associated interface of the target point of interest, another user may view, when browsing the associated interface of the target point of interest, the comment information posted by the user and the target image in the comment information.

In a possible design, after the sharing the target image on an associated interface of the target point of interest in a target application, the method further includes: obtaining exchanged data corresponding to the target image on the associated interface of the target point of interest; and displaying the target image in an album application, and displaying, on the target image, the exchanged data corresponding to the target image, where the exchanged data corresponding to the target image is data corresponding to an exchanging operation triggered by another user on the target image in the target application.

According to this design, the electronic device may display, on the target image in the album application, the exchanged data corresponding to the target image, so that the user can view, without a need to start the target application, exchanged information such as a comment or a like of the another user on the target image when browsing the target image, to improve user experience.

In a possible design, the exchanged data includes at least one of data corresponding to a browse operation triggered by the another user on the target image in the target application, data corresponding to a comment operation triggered by the another user on the target image in the target application, and data corresponding to a like giving operation triggered by the another user on the target image in the target application.

According to this design, the electronic device may obtain the data corresponding to the operation like browsing, like giving, or commenting, performed by the another user on the target image in the target application, and display the data on the target image in the album application. In this way, information that can be displayed on the target image in the album is enriched, and user experience is improved.

In a possible design, the method further includes: displaying the shooting preview interface, and receiving a recommended shooting location that corresponds to the target point of interest and that is sent by a server of the target application, where the shooting preview interface includes the recommended shooting location; in response to a sixth operation of the user, determining a navigation route from the current location of the electronic device to the recommended shooting location; and displaying a navigation interface, where the navigation interface is used for displaying the navigation route.

According to this design, the server of the target application may determine the recommended shooting location corresponding to the target point of interest, and send the recommended shooting location to the electronic device. The electronic device may navigate the user based on the recommended shooting location, to guide the user to shoot a photo at a location with a better shooting effect, so as to provide better shooting experience for the user.

In a possible design, the method further includes: when the associated interface of the target point of interest is displayed, in response to a seventh operation performed by the user on a first image, obtaining point of interest information of the first image, and determining the recommended shooting location based on the point of interest information of the first image; in response to a sixth operation of the user, determining a navigation route from the current location of the electronic device to the recommended shooting location, and displaying a navigation interface, where the navigation interface is used for displaying the navigation route.

According to this design, when browsing the associated interface of the target point of interest, the user may trigger "Shoot the same type" for the first image shared by the another user, and the electronic device may obtain the recommended shooting location corresponding to the first image, and perform navigation based on the recommended shooting location corresponding to the first image, to combine a navigation function with image shooting, so as to enrich functions of the electronic device.

In a possible design, the method further includes: obtaining a recommended shooting azimuth, and determining a current camera azimuth of the electronic device; and generating a third notification message based on the current camera azimuth of the electronic device and the recommended shooting azimuth, and displaying the third notification message, where the third notification message is used for prompting the user to adjust a shooting azimuth of the electronic device.

According to this design, the electronic device may prompt the user to adjust the shooting azimuth of the electronic device, to provide a shooting guide for the user.

According to a second aspect, this application provides an electronic device, including at least one processor and at least one memory. The at least one memory stores computer program instructions, and when the electronic device runs, the at least one processor performs the method performed by the electronic device in any one of the aspects and the implementations of the aspects.

According to a third aspect, this application provides an electronic device. The electronic device includes a plurality of functional modules, and the plurality of functional modules interact with each other, to implement the method performed by the electronic device in any one of the aspects and the implementations of the aspects. The plurality of functional modules may be implemented based on software, hardware, or a combination of software and hardware, and the plurality of functional modules may be randomly combined or divided based on a specific implementation.

According to a fourth aspect, this application further provides a computer program product including instructions. When the computer program product runs on a computer, the computer is enabled to perform the method performed by the electronic device in any one of the aspects and the implementations of the aspects.

According to a fifth aspect, this application further provides a computer-readable storage medium. The computer-readable storage medium stores a computer program. When the computer program is executed by a computer, the computer is enabled to perform the method performed by the electronic device in any one of the aspects and the implementations of the aspects.

According to a sixth aspect, this application further provides a chip. The chip is configured to read a computer program stored in a memory, to perform the method performed by the electronic device in any one of the aspects and the implementations of the aspects.

According to a seventh aspect, this application further provides a chip system. The chip system includes a processor, configured to support a computer apparatus in implementing the method performed by the electronic device in any one of the aspects and the implementations of the aspects. In a possible design, the chip system further includes a memory. The memory is configured to store a program and data that are necessary for the computer apparatus. The chip system may include a chip, or may include a chip and another discrete component.

BRIEF DESCRIPTION OF DRAWINGS

FIG. 5 is a flowchart of an image shooting and sharing method according to an embodiment of this application;

DESCRIPTION OF EMBODIMENTS

To make objectives, technical solution, and advantages of embodiments of this application clearer, the following further describes embodiments of this application in detail with reference to the accompanying drawings. The terms "first" and "second" below in descriptions of embodiments of this application are merely used for a description purpose, and shall not be understood as an indication or implication of relative importance or implicit indication of a quantity of indicated technical features Therefore, a feature limited by "first" or "second" may explicitly or implicitly include one or more features.

It should be understood that, in embodiments of this application, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following" or similar expressions refer to any combination of these items, including any combination of single items or a plurality of items. For example, at least one of a, b, or c may indicate a, b, c, a and b, a and c, b and c, or a, b, and c, where a, b, and c may be singular or plural.

Figure 1:
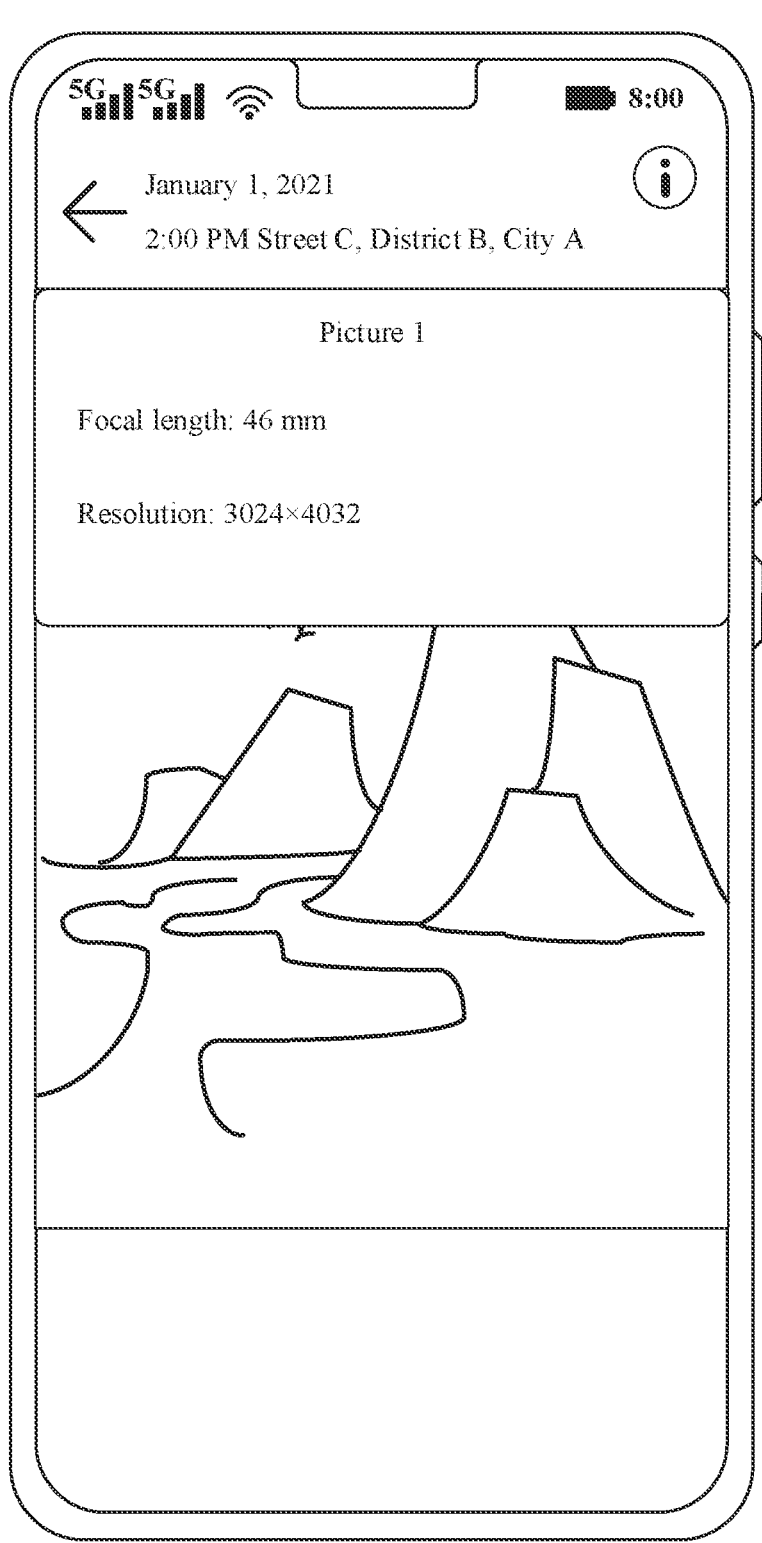
FIG. 1 is a schematic diagram of displaying an image.

An album application of an electronic device may store an image obtained by the electronic device through shooting, or may store an image downloaded by a user to the electronic device locally. FIG. 1 is a schematic diagram of displaying an image. As shown in FIG. 1, when displaying an image, the electronic device may simultaneously display image information of the image, such as a shooting time, a shooting location, a shooting focal length, and image resolution. The shooting location in the image information is generally a broad administrative division location. As shown in FIG. 1, the shooting location of the image is Street C, District B, City A. The information is an attribute of the image or a shooting parameter of a camera and it is difficult for the user to obtain information related to image content from the image information.

Figure 2:
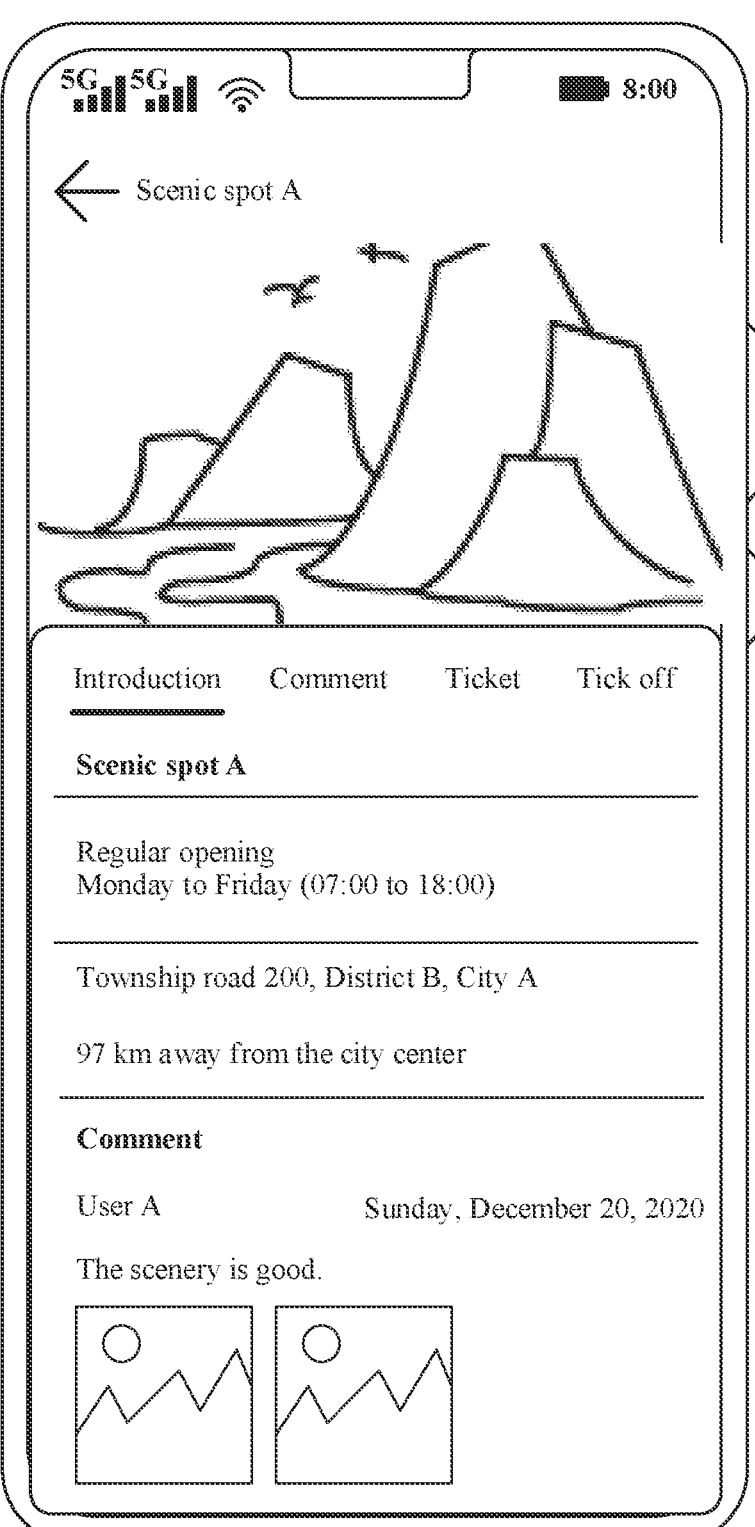
FIG. 2 is a schematic diagram of a POI interface of a map application.

Different from the image information, point of interest (point of interest, POI) information is information clearly perceived by the user. The POI is a place that the user may be interested in. For example, the POI may be a building, a scenic spot, or a business place. The POI information may include a geographical location, a name, an introduction, an image, or the like of the POI. The POI information may be displayed in some applications. For example, FIG. 2 is a schematic diagram of a POI interface of a map application. The user can search for the POI in the map application and tap to view the POI interface. In FIG. 2, an example in which the map application displays an interface of Scenic spot A is used. In this case, the POI is Scenic spot A. As shown in FIG. 2, the POI interface may include a geographical location of Scenic spot A, a related introduction of Scenic spot A, and comments posted by users on Scenic spot A. The comments posted by users may include text content, an image of Scenic spot A shot by the user, and the like. The user may choose to upload or shoot an image on the POI interface, but the user can only view related information of the POI on the POI interface. The related information of the POI is not associated with an image in an album application of the electronic device, and the user can only manually operate, to search for the POI interface, and upload the image in the album to the POI interface. Consequently, user experience is poor.

Based on the foregoing problem, this application provides an image shooting and sharing method, to provide a quick image sharing manner, and enrich image information, so as to improve user experience. In the method, the electronic device displays a shooting preview interface in response to a first operation of the user, determines information about a target point of interest, and displays the information about the target point of interest on the shooting preview interface. The target point of interest is a point of interest corresponding to a current location of the electronic device. In response to a second operation of the user, the electronic device obtains a target image through shooting, where image information of the target image includes the information about the target point of interest. The electronic device displays the target image. The electronic device shares the target image on an associated interface of the target point of interest in a target application after a third operation of the user. According to the image shooting and sharing method provided in this application, when the user uses the electronic device to shoot the image, the electronic device may obtain the target point of interest corresponding to the current location of the electronic device, and after obtaining the target image through shooting, use the information about the target point of interest as a piece of image information of the target image, to enrich the image information and provide the user with the point of interest information that can be easily perceived. In addition, when displaying the target image, the electronic device may further support the user in sharing the target image on the associated interface of the target point of interest in the target application in a one-tap mode, to provide a convenient image sharing manner, and reduce operation steps of the user, so as to improve user experience.

The following describes the electronic device, and embodiments for using such an electronic device. The electronic device in embodiments of this application includes a shooting apparatus, for example, a camera. The electronic device in embodiments of this application may be a tablet computer, a mobile phone, a vehicle-mounted device, an augmented reality (augmented reality, AR)/virtual reality (virtual reality, VR) device, a notebook computer, or an ultra-mobile personal computer (ultra-mobile personal computer, UMPC), a netbook, a personal digital assistant (personal digital assistant, PDA), a wearable device, or the like. A specific type of the electronic device is not limited in embodiments of this application.

In some embodiments of this application, the electronic device may alternatively be a portable terminal device that further includes another function like a personal digital assistant and/or a music player function. An example embodiment of the portable terminal device includes but is not limited to a portable terminal device using iOS®, Android®, Microsoft®, Harmony®, or another operating system.

Figure 3:
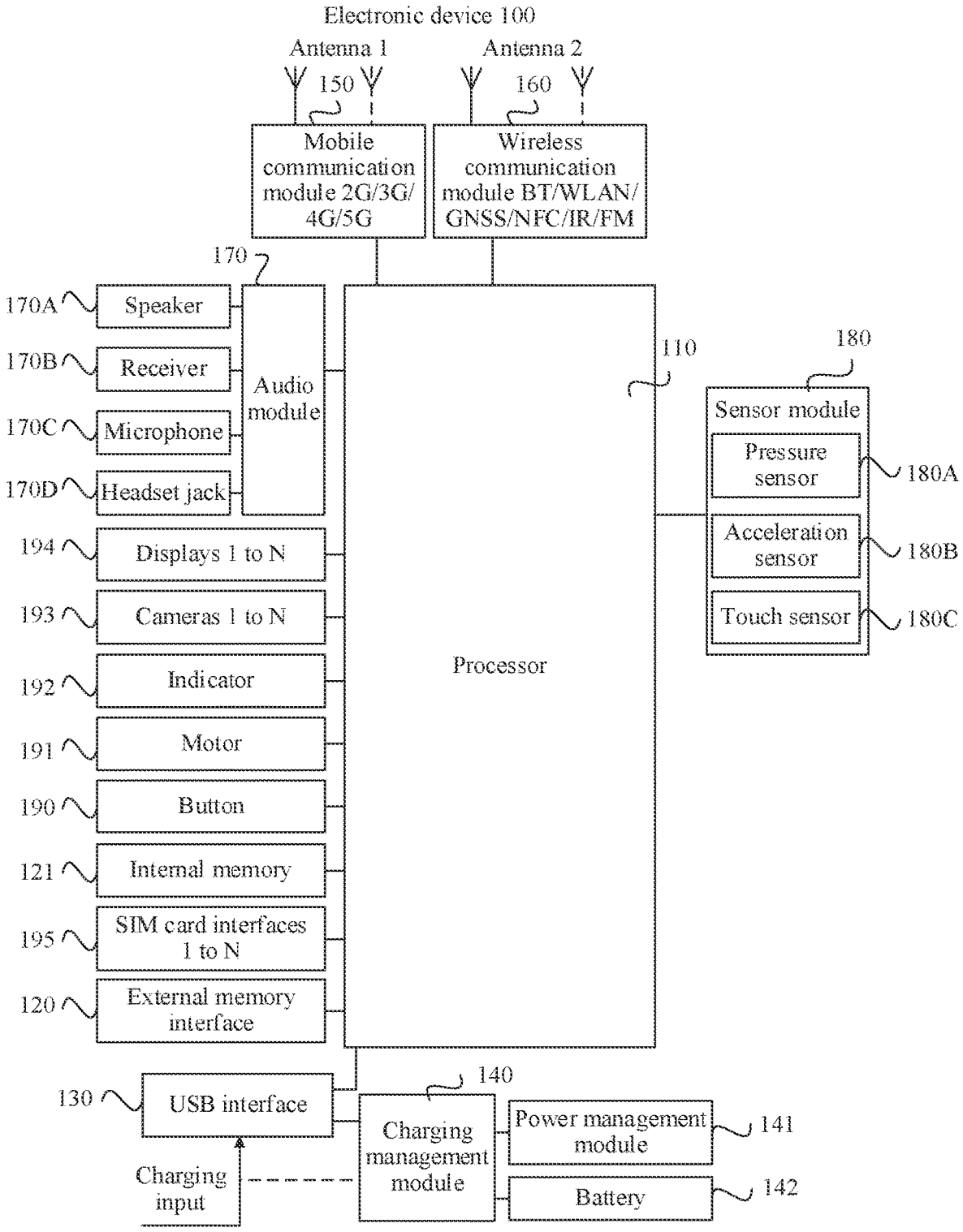
FIG. 3 is a schematic diagram of a structure of an electronic device according to an embodiment of this application.

FIG. 3 is a schematic diagram of a structure of an electronic device 100 according to an embodiment of this application. As shown in FIG. 3, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device 100. The controller may generate an operation control signal based on an instruction operation code and a time sequence signal, to complete control of instruction reading and instruction execution. A memory may be further disposed in the processor 110, and is configured to store instructions and data. In some embodiments, the memory in the processor 110 is a cache memory. The memory may store the instructions or the data that have/has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device. The charging management module 140 is configured to receive a charging input from the charger. The power management module 141 is configured to connect the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the electronic device 100 may be implemented through the antenna 1, the antenna 2, the mobile communication module 150, the wireless communication module 160, the modem processor, the baseband processor, and the like. The antenna 1 and the antenna 2 are configured to transmit and receive an electromagnetic wave signal Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application, for example, display a display page of an application installed on the electronic device 100. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The camera 193 is configured to capture a static image or a video. An optical image of an object is generated through lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1. In this embodiment of this application, the camera 193 may be configured to capture a target image. When the user triggers starting of the camera application, the display 194 may display a shooting preview interface, and display, on the shooting preview interface in real time, an image captured by the camera 193. In addition, the display 194 may further display information about a target point of interest corresponding to a location at which the electronic device 100 is currently located.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, software code of at least one application program, and the like. The data storage area may store data (for example, a captured image or a recorded video) and the like generated when the electronic device 100 is used. In addition, the internal memory 121 may include a high-speed random access memory, or may include a non-volatile memory, for example, at least one magnetic disk storage device, a flash memory device, or a universal flash storage (universal flash storage, UFS).

The external memory interface 120 may be configured to connect to an external memory card, for example, a micro SD card, to extend a storage capability of the electronic device. The external memory card communicates with the processor 110 through the external memory interface 120, to implement a data storage function. For example, files such as images or videos are stored in the external memory card.

The electronic device 100 may implement an audio function, for example, music playing and recording, by using the audio module 170, the speaker 170A, the receiver 170B, the microphone 170C, the headset jack 170D, the application processor, and the like.

The sensor module 180 may include a pressure sensor 180A, an acceleration sensor 180B, a touch sensor 180C, and the like.

The pressure sensor 180A is configured to sense a pressure signal, and can convert the pressure signal into an electrical signal. In some embodiments, the pressure sensor 180A may be disposed on the display 194.

The touch sensor 180C is also referred to as a "touch panel". The touch sensor 180C may be disposed on the display 194, and the touch sensor 180C and the display 194 form a touchscreen, which is also referred to as a "touch screen". The touch sensor 180C is configured to detect a touch operation performed on or near the touch sensor 180C. The touch sensor may transfer the detected touch operation to the application processor to determine a type of a touch event. A visual output related to the touch operation may be provided on the display 194. In some other embodiments, the touch sensor 180C may alternatively be disposed on a surface of the electronic device 100 at a location different from that of the display 194.

The button 190 includes a power button, a volume button, and the like. The button 190 may be a mechanical button, or may be a touch button. The electronic device 100 may receive a button input, and generate a button signal input related to a user setting and function control of the electronic device 100. The motor 191 may generate a vibration prompt. The motor 191 may be configured to provide an incoming call vibration prompt and a touch vibration feedback. For example, touch operations performed on different applications (for example, shooting and audio playback) may correspond to different vibration feedback effects. A touch vibration feedback effect may be further customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to come into contact with and be separated from the electronic device 100.

It can be understood that the components shown in FIG. 3 do not constitute a specific limitation on the electronic device 100. The electronic device may further include more or fewer components than those shown in the figure, or combine some components, or split some components, or have different component arrangements. In addition, a combination/connection relationship between the components in FIG. 3 may also be adjusted and modified.

Figure 4:
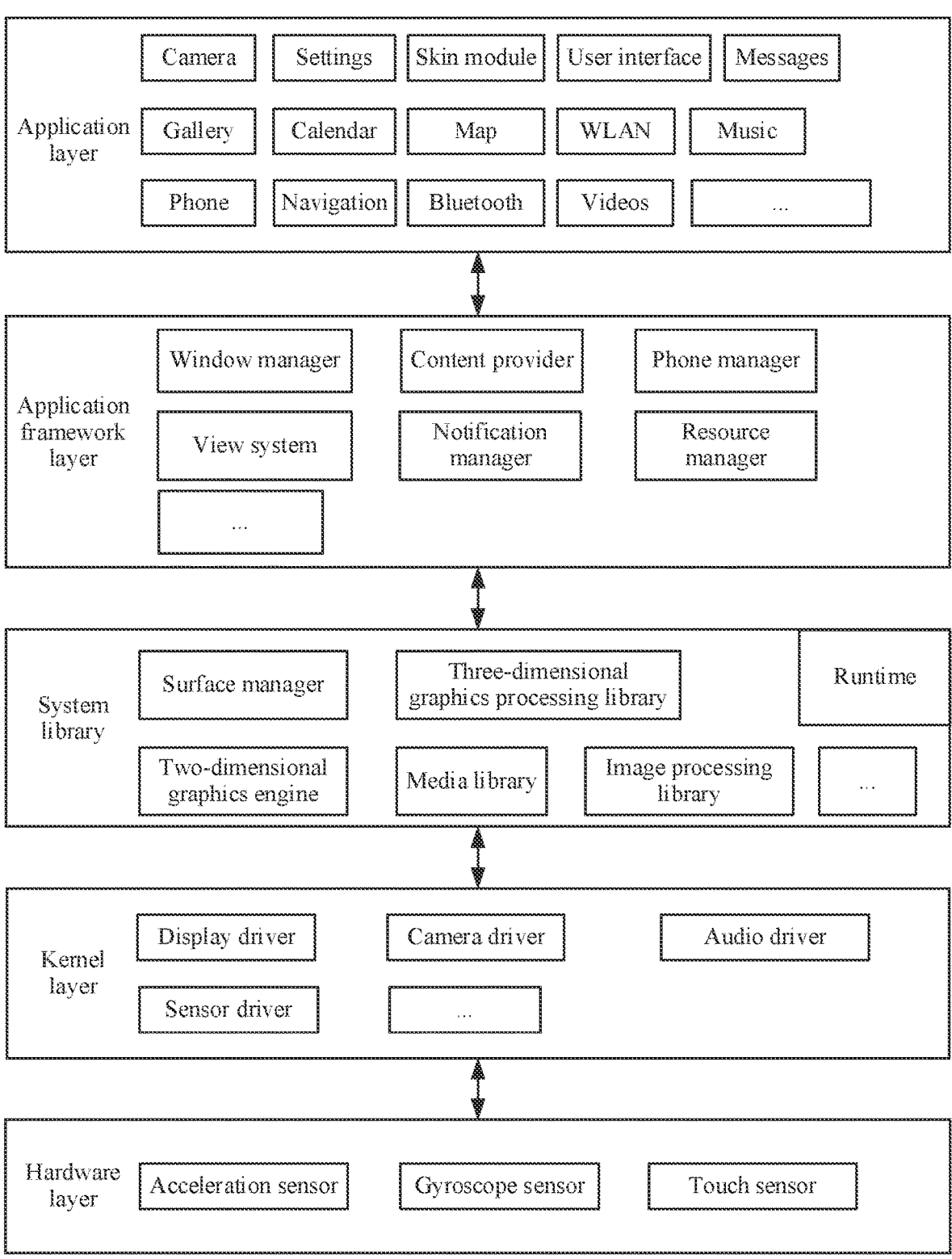
FIG. 4 is a block diagram of a software structure of an electronic device according to an embodiment of this application.

FIG. 4 is a block diagram of a software structure of an electronic device according to an embodiment of this application. As shown in FIG. 4, the software structure of the electronic device may be a layered architecture. For example, software may be divided into several layers, and each layer has a clear role and responsibility. The layers communicate with each other through a software interface. In some embodiments, an operating system is divided into four layers: an application layer, an application framework (framework, FWK) layer, runtime (runtime) and a system library, and a kernel layer from top to bottom.

The application layer may include a series of application packages (application package). As shown in FIG. 4, the application layer may include Camera, Settings, a skin module, a user interface (user interface, UI), a third-party application, and the like. The third-party application may include Gallery, Calendar, Phone, Map, Navigation, WLAN, Bluetooth, Music, Videos, Messages, and the like. In embodiments of this application, the target application may be, for example, Map or Navigation.

The application program framework layer provides an application programming interface (application programming interface, API) and a programming framework for an application program at the application program layer. The application framework layer may include some predefined functions. As shown in FIG. 4, the application framework layer may include a window manager, a content provider, a view system, a phone manager, a resource manager, and a notification manager.

The window manager is configured to manage a window program. The window manager may obtain a size of the display, determine whether there is a status bar, perform screen locking, take a screenshot, and the like. The content provider is configured to: store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including a notification icon of Messages may include a view for displaying a text and a view for displaying an image.

The phone manager is configured to provide a communication function of the electronic device, for example, management of a call status (including answering, declining, or the like).

The resource manager provides various resources such as a localized character string, an icon, an image, a layout file, and a video file for an application program.

The notification manager enables an application to display notification information in a status bar, and may be configured to convey a notification message, which may automatically disappear after a short pause without requiring a user interaction. For example, the notification manager is configured to: notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an alert tone is issued, the electronic device vibrates, or the indicator light blinks.

The runtime includes a kernel library and a virtual machine. The runtime is responsible for scheduling and management of the operating system.

The kernel library includes two parts: a function that needs to be called in a Java language and a kernel library of the operating system. The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL ES), a two-dimensional graphics engine (for example, SGL), and an image processing library.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The hardware layer may include various sensors such as an acceleration sensor, a gyroscope sensor, and a touch sensor.

It should be noted that the structures shown in FIG. 3 and FIG. 4 are merely examples of the electronic device provided in embodiments of this application, and cannot impose any limitation on the electronic device provided in embodiments of this application. In a specific implementation, the electronic device may have more or fewer components or modules than those in the structures shown in FIG. 3 or FIG. 4.

The following describes an image shooting and sharing method provided in embodiments of this application.

First, a plurality of applications in embodiments of this application are described.

A camera application is an application that is installed on an electronic device and that is used for capturing multimedia content such as an image, a video, and an animation. The camera application may invoke a camera of the electronic device to capture an image or a video, and display the image or the video captured by the camera on a display of the electronic device. After a user triggers starting of the camera application, the electronic device may display a shooting preview interface on the display, and display, on the shooting preview interface in real time, the image captured by the camera. Optionally, the camera application may be a system application provided by the electronic device, or may be a third-party application downloaded and installed on the electronic device. This is not limited in embodiments of this application.

An album application is an application that is installed on the electronic device and that is used for storing multimedia content such as an image, a video, and an animation. After the user triggers starting of the album application, the electronic device may display an interface of the album application, and the user may browse, on the interface, the multimedia content such as an image, a video, and an animation in the album application. The multimedia content in the album application may be obtained by the electronic device through shooting, for example, the image or the video obtained by using the camera application through shooting. The multimedia content in the album application may alternatively be content downloaded by the user to the electronic device locally on the Internet. Optionally, the album application may also be referred to as a gallery application, a photo application, or the like.

In embodiments of this application, the target application is an application that can display a POI interface. For example, the target application may be a map application or a commenting social application. Optionally, the target application may display identifiers of a plurality of POIs. After the user selects a target POI from the plurality of POIs, the electronic device may display a target POI interface, and the target POI interface may display POI information. The POI information may include a geographical location, a name, an introduction, an image, and the like of the POI.

When the image shooting and sharing method provided in embodiments of this application is applied to the electronic device, the electronic device may provide a POI sharing function, and the user may enable the POI sharing function in system settings, to use the image shooting and sharing method provided in embodiments of this application. The following further describes the image shooting and sharing method provided in embodiments of this application. FIG. 5 is a flowchart of an image shooting and sharing method according to an embodiment of this application. The method may be performed by an electronic device, and the electronic device may have the structure shown in FIG. 3 and/or FIG. 4. As shown in FIG. 5, the method may include the following steps.

S501: The electronic device displays a shooting preview interface in response to a first operation of a user, determines information about a target point of interest, and displays the information about the target point of interest on the shooting preview interface.

Optionally, the first operation may be an operation for starting a camera application. For example, the first operation is a tap operation performed on a camera icon. For another example, the first operation is a voice instruction that is input by the user and that instructs to start the camera application.

In this embodiment of this application, the electronic device starts the camera application in response to the first operation, and the electronic device displays the shooting preview interface on a display, where the shooting preview interface is used for displaying an image currently captured by a camera.

The electronic device may further determine the target point of interest, and obtain the information about the target point of interest. Optionally, the target point of interest may be a point of interest corresponding to a current location of the electronic device. The information about the target point of interest may include at least one of content such as a name, a location, a direction relative to the current location of the electronic device, a distance between the target point of interest and the current location of the electronic device, a point of interest type, a phone number, and an image of the target point of interest. The target point of interest type may be, for example, a hotel, a scenic spot, a building (for example, an airport, a station, or a landmark building), or a restaurant.

In an optional implementation, after starting the camera application, the electronic device can obtain a current geographical location of the electronic device. For example, the electronic device can obtain the current geographical location of the electronic device based on a positioning module in the electronic device. The electronic device may invoke a global reverse geocoding service based on the current geographical location, to determine the target point of interest. For example, the geographical location may be longitude and latitude information. The global reverse geocoding service may pre-store a correspondence between latitude and longitude information and POI information.

In another optional implementation, the electronic device may alternatively obtain the image captured by the camera, and perform image recognition on the captured image, to determine the target point of interest.

It should be noted that the foregoing manners of determining the target point of interest are merely examples rather than limitations. In a specific implementation, the electronic device may alternatively determine, in another manner, the point of interest corresponding to the current location. This is not limited in embodiments of this application.

For example, when determining the target point of interest, the electronic device may further set the point of interest type. For example, the electronic device may search for a point of interest whose point of interest type is a scenic spot or a catering business place, and use the point of interest as the target point of interest. In a specific implementation, the point of interest type used when the electronic device searches for the target point of interest may be a preset type or a user-defined type. This is not limited in embodiments of this application.

In this embodiment of this application, the electronic device may determine one or more target points of interest. When the target points of interest determined by the electronic device include a plurality of points of interest, the electronic device may display information about all the plurality of points of interest on the shooting preview interface, or the electronic device may select one of the plurality of points of interest, and display information about the selected point of interest on the shooting preview interface. For example, the target point of interest determined by the electronic device is one point of interest. The target point of interest may be a point of interest closest to the current location of the electronic device, or the target point of interest may be a point of interest with a largest quantity of views in a plurality of points of interest whose distances from the current location of the electronic device are less than a preset threshold.

Figure 6:
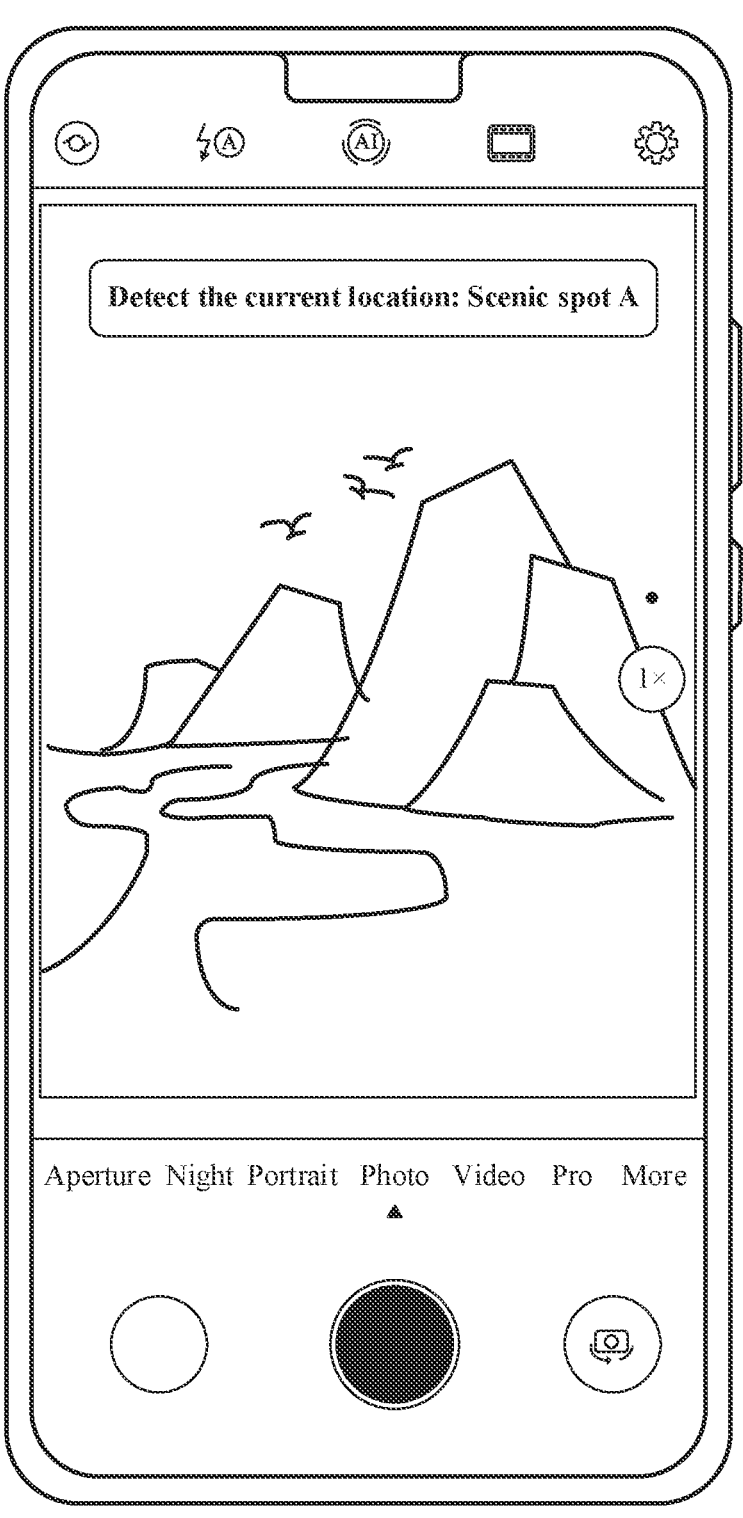
FIG. 6 is a schematic diagram of a shooting preview interface according to an embodiment of this application.

After determining the target point of interest and the information about the target point of interest, the electronic device may display the information about the target point of interest on the shooting preview interface. For example, FIG. 6 is a schematic diagram of a shooting preview interface according to an embodiment of this application. As shown in FIG. 6, the electronic device displays the shooting preview interface, and the shooting preview interface may include the information about the target point of interest. As shown in FIG. 6, the information about the target point of interest is a name "Scenic spot A" of the target point of interest.

S502: In response to a second operation of the user, the electronic device obtains a target image through shooting.

Optionally, the second operation may be a tap operation performed on a shooting control, or the second operation may be a voice instruction that is input by the user and that is used for controlling shooting.

In this embodiment of this application, image information of the target image may include a part or all of the information about the target point of interest. For example, the image information of the target image may include the geographical location, the name, the introduction, the image, and the like of the target point of interest.

It should be noted that, in this embodiment of this application, using the electronic device to shoot an image is merely an example rather than a limitation. In a specific implementation, the method provided in embodiments of this application may be further applied to a scenario in which multimedia content such as an animation or a video is shot.

S503: The electronic device displays the target image.

In an optional implementation, after the electronic device obtains the target image through shooting, the electronic device may continue to display the shooting preview interface. After the user triggers an operation for displaying the target image, the electronic device may display the target image on the display. For example, the operation that is triggered by the user and that is used for displaying the target image is a tap operation performed on a thumbnail of the target image.

In another optional implementation, after obtaining the target image through shooting, the electronic device may directly display the target image on the display.

Figure 7:
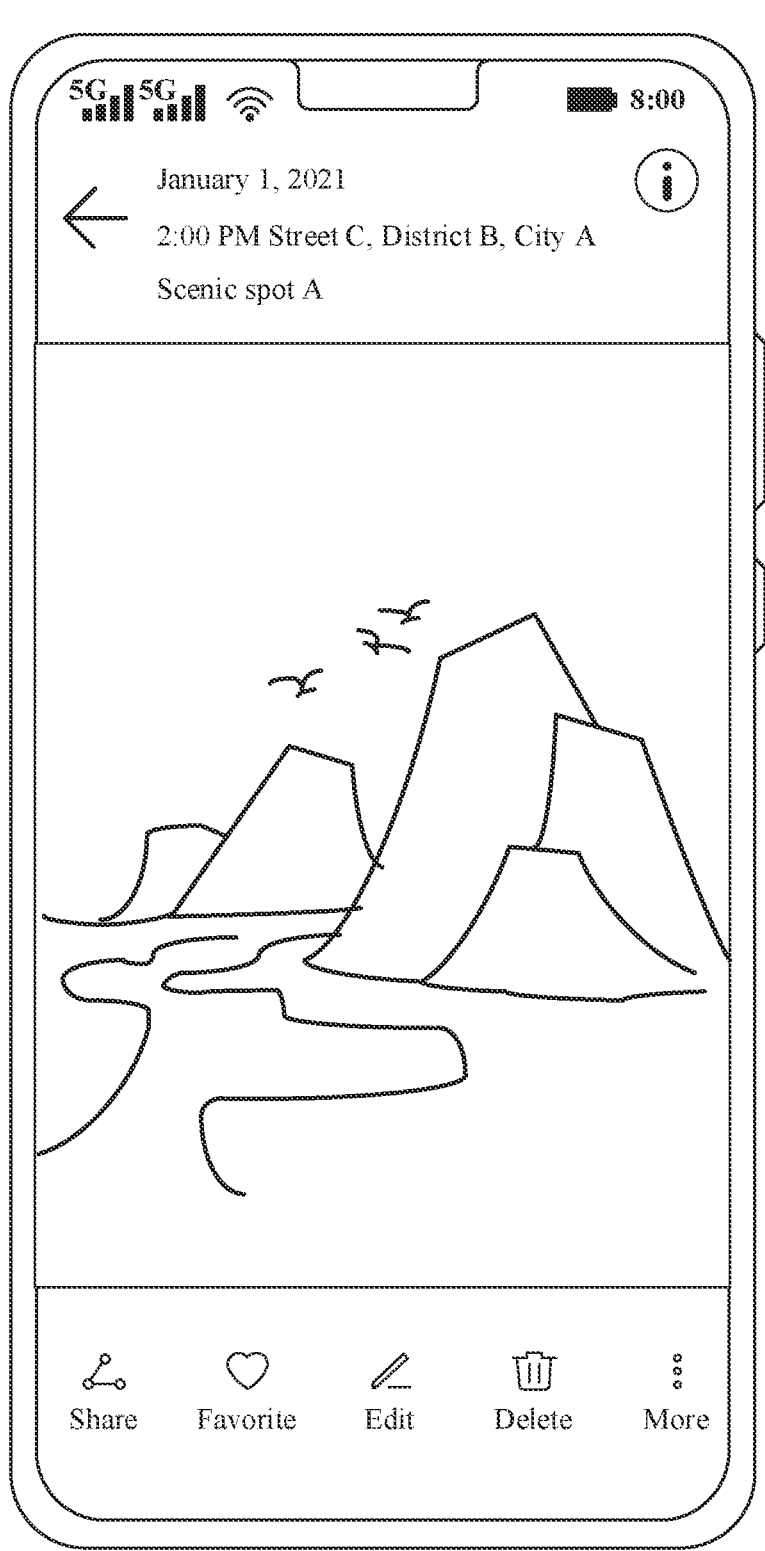
FIG. 7 is a schematic diagram of displaying a target image according to an embodiment of this application.

Optionally, the electronic device may further display the target image in the album application, and the image information of the target image may include the information about the target point of interest. For example, FIG. 7 is a schematic diagram of displaying a target image in an album application according to an embodiment of this application. As shown in FIG. 7, when displaying the target image, the electronic device may display the information about the target point of interest. For example, in FIG. 7, the name of the point of interest "Scenic spot A" is displayed.

S504: The electronic device shares the target image on an associated interface of the target point of interest in a target application after a third operation of the user.

Optionally the third operation may be an operation of sharing the target image on the associated interface of the target point of interest in the target application. For example, the third operation may be a tap operation performed on a sharing control corresponding to the target application.

Figure 8:
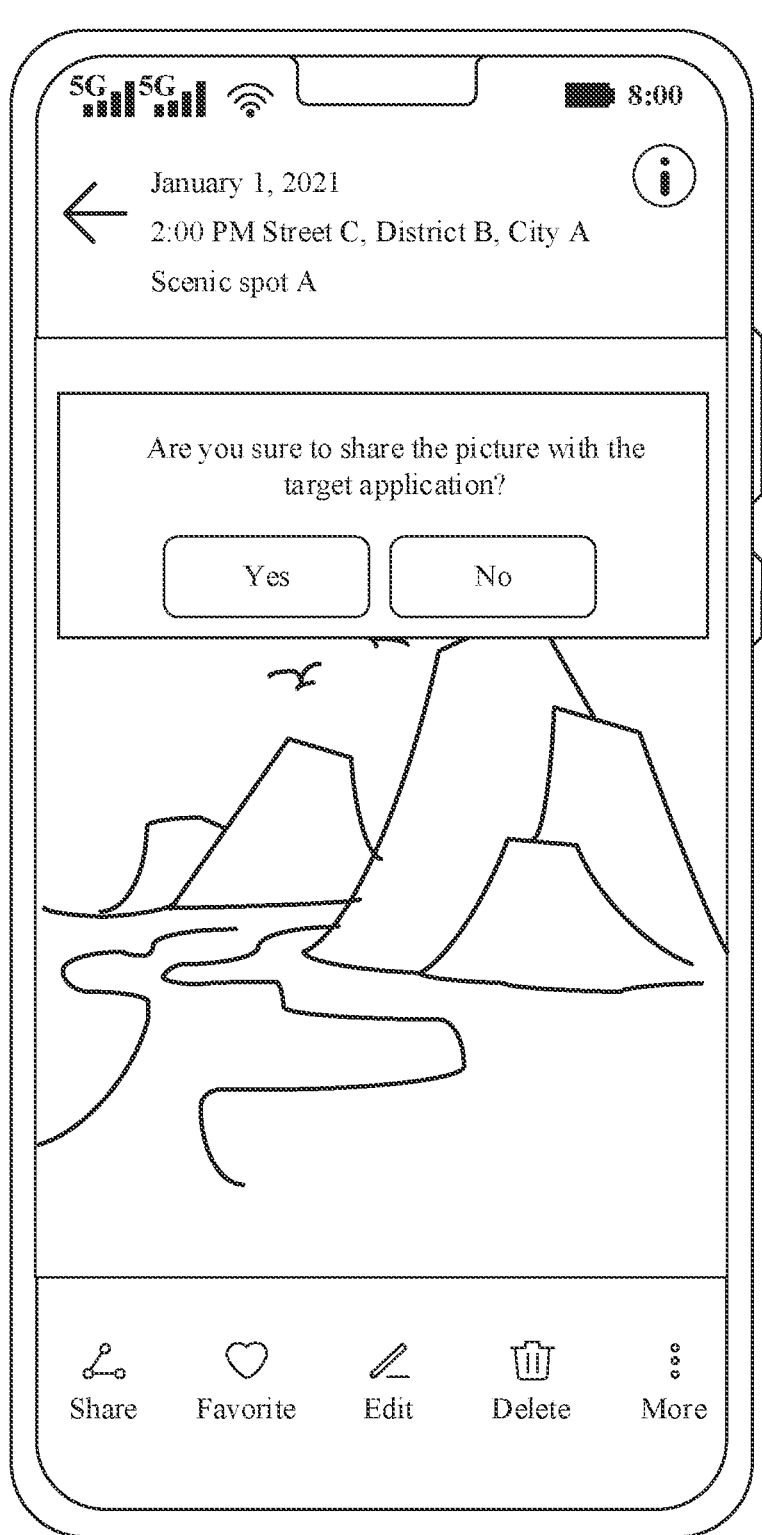
FIG. 8 shows a display interface of a target image according to an embodiment of this application.

In some implementations of this application, when the electronic device displays the target image, the electronic device may perform image recognition on the target image, and when determining that the target image includes sensitive information, the electronic device may display a first notification message on the display. The first notification message may be used for querying the user whether to share the target image with the target application. For example, FIG. 8 shows a display interface of a target image according to an embodiment of this application. As shown in FIG. 8, the electronic device may display the first notification message on the target image. In FIG. 8, the first notification message is "Are you sure to share the image with the target application?". The user may tap the sharing control in the first notification message to trigger the third operation. According to this design, when determining that the target image includes the sensitive information, the electronic device may query the user whether to share the target image, to ensure image sharing security and prevent leakage of sensitive information of the user.

In some other embodiments of this application, the electronic device may further perform image recognition on the target image, and extract characteristic information of the target image and the sensitive information of the target image. The electronic device may determine a sensitive information proportion based on the sensitive information and the characteristic information of the target image. When the sensitive information proportion is less than a specified threshold, the electronic device may display the first notification message on the display, where the first notification message may be used for querying the user whether to share the target image with the target application. For example, as shown in FIG. 8, the electronic device may display the first notification message on the target image. In FIG. 8, the first notification message is "Are you sure to share the image with the target application?". The user may tap the sharing control in the first notification message to trigger the third operation. According to this design, when determining that the proportion of the sensitive information in the target image to the characteristic information in the target image is less than the specified threshold, the electronic device queries the user whether to share the target image, to improve image sharing security and improve user experience.

Figure 9A:
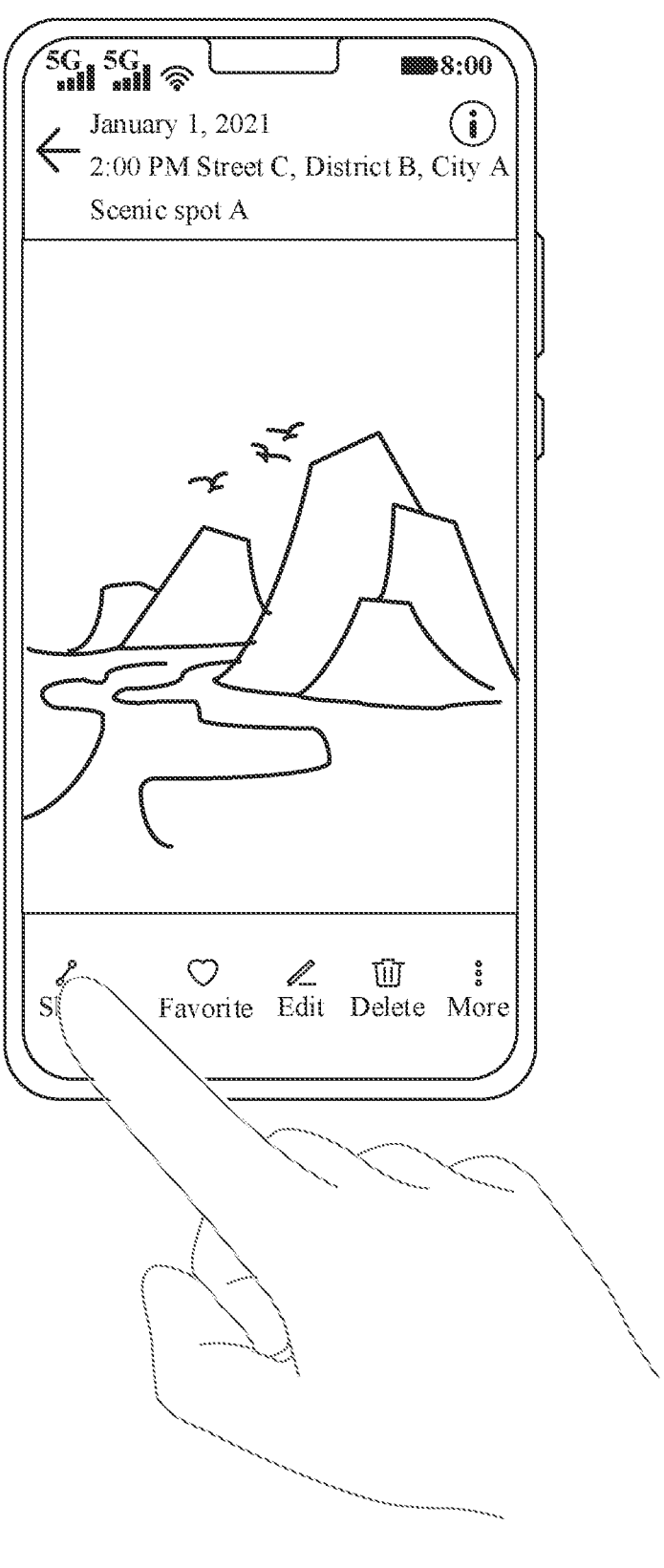
FIG. 9(*a*) and FIG. 9(*b*) are a schematic diagram of sharing a target image according to an embodiment of this application.
Figure 9B:
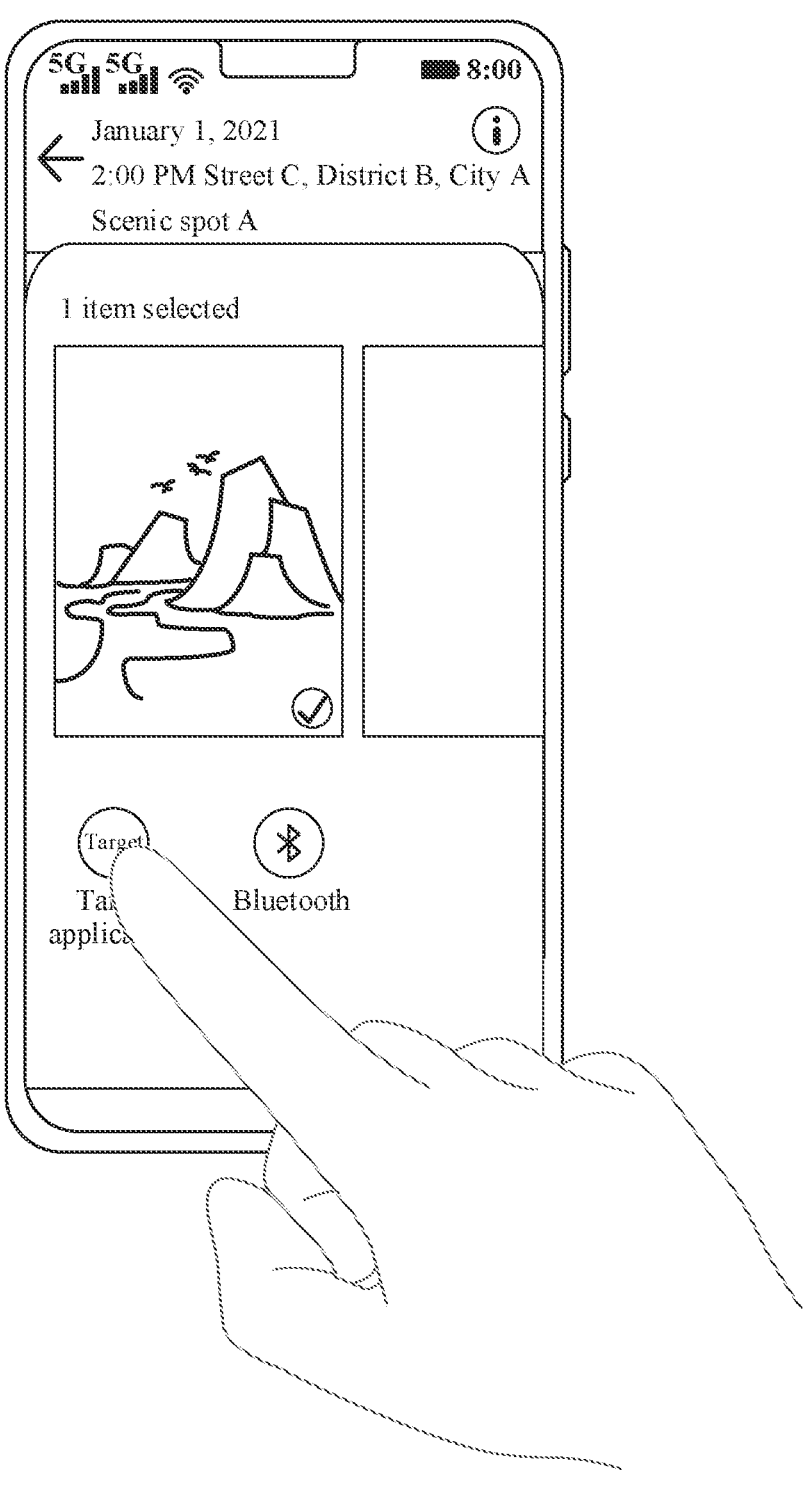

In some other embodiments of this application, when the electronic device displays the target image, the user may tap the sharing control on the interface, and select the target application on the sharing interface, to trigger the third operation. For example, FIG. 9(a) and FIG. 9(b) are a schematic diagram of sharing a target image according to an embodiment of this application. As shown in FIG. 9(a), the user taps the sharing control on the interface including the target image, the electronic device displays a sharing interface shown in FIG. 9(b), and the user taps an icon of the target application on the sharing interface, to trigger the third operation.

In other words, in this embodiment of this application, the electronic device may display the first notification message to query the user whether to share the target image with the target application, or the user may manually select to share the target image with the target application.

In some scenarios, when the electronic device determines that a plurality of applications in the electronic device include the associated interface of the target point of interest, after the user triggers the third operation, the electronic device may use an application that is most frequently used by the user in the plurality of applications as the target application; or the electronic device may display the plurality of applications, and the user may select one application from the plurality of applications as the target application, where the target application may be an application with which the user wants to share the target image.

In response to the third operation of the user, the electronic device may start the target application, and display a target interface based on the information about the target point of interest of the target image. The target interface may be an associated interface on which the target image is shared with the target point of interest.

Figure 10A:
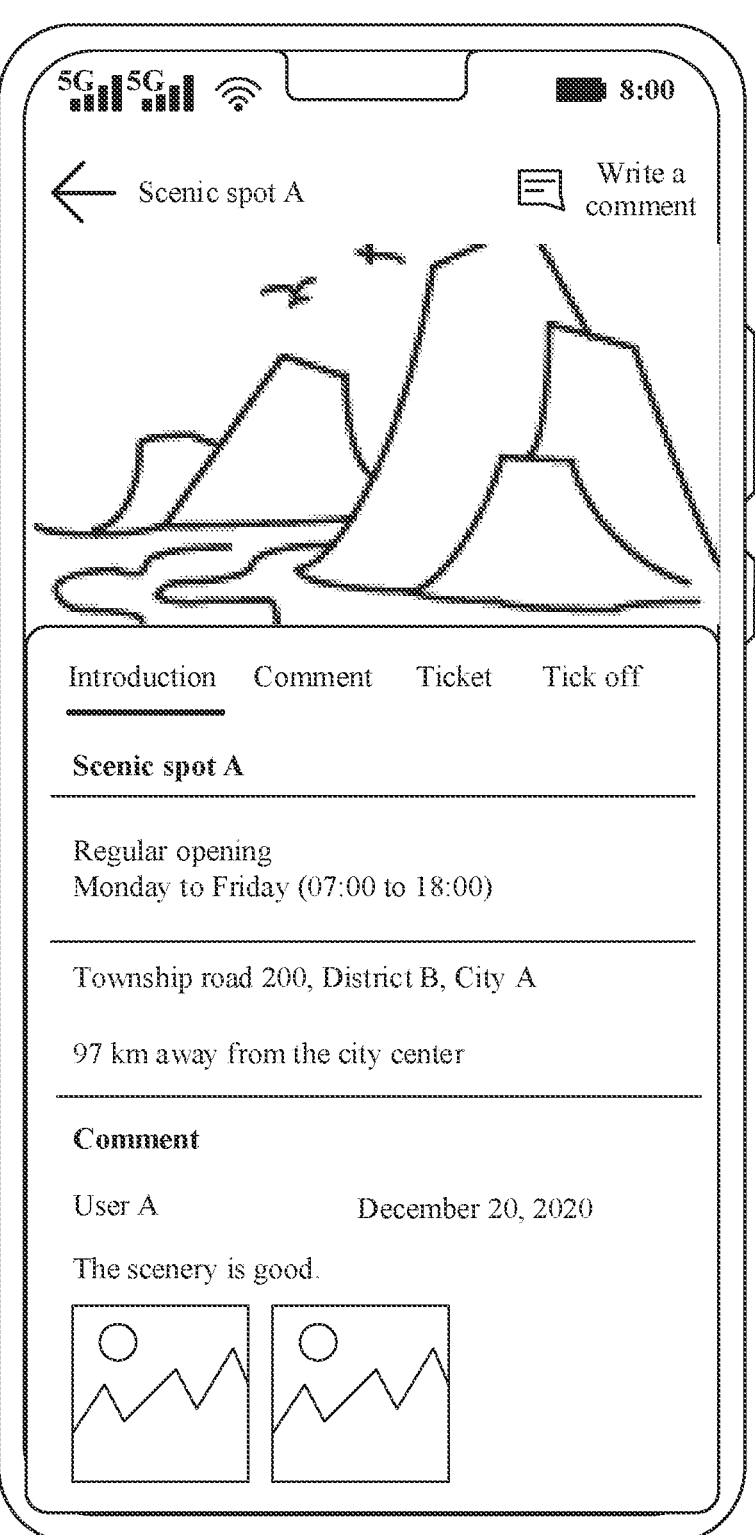
FIG. 10(*a*) and FIG. 10(*b*) are a schematic diagram of a target interface according to an embodiment of this application.
Figure 10B:
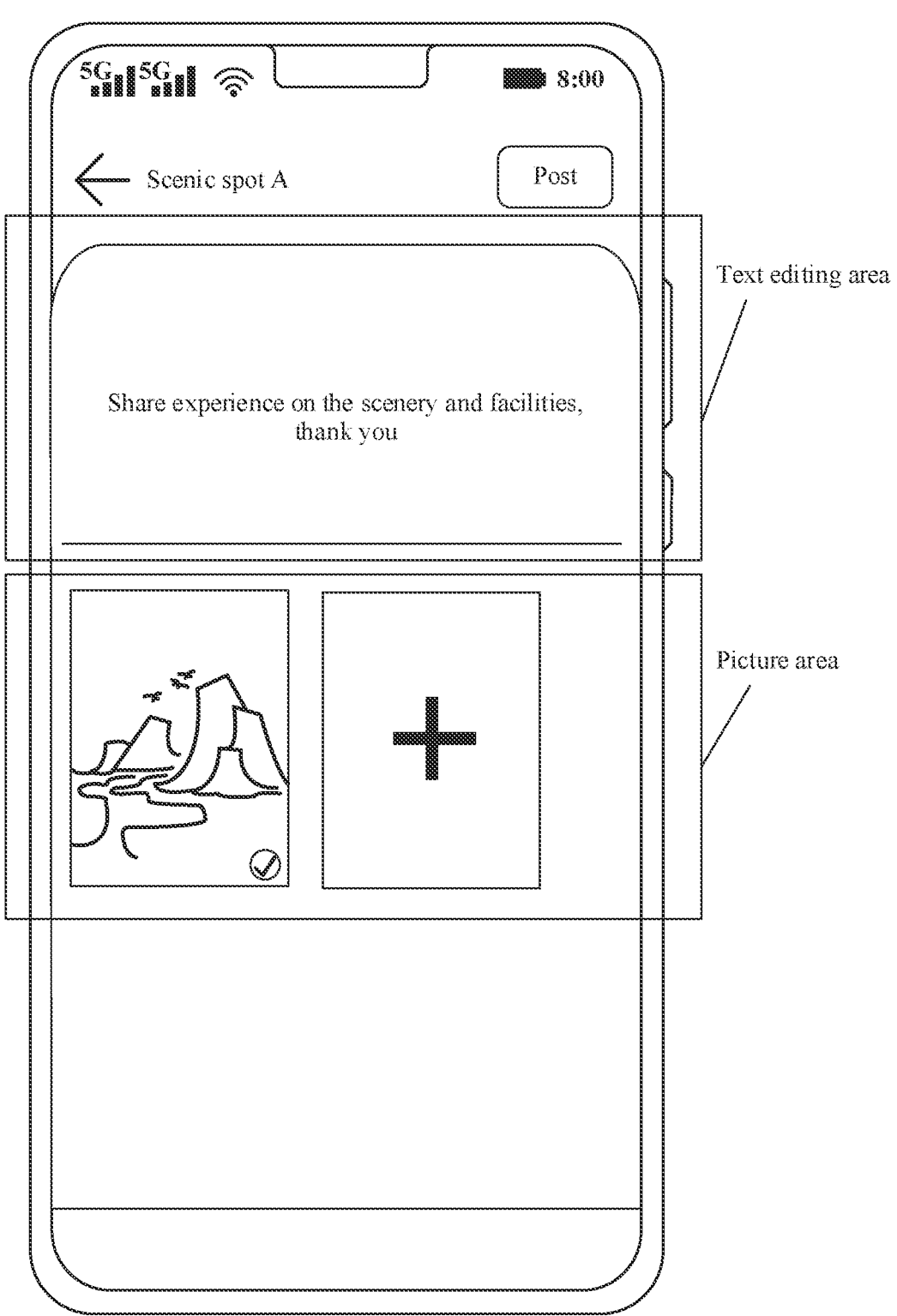

For example, FIG. 10(a) and FIG. 10(b) are a schematic diagram of a target interface according to an embodiment of this application. As shown in FIG. 10(a), the target interface may be the associated interface of the target point of interest, and in response to the third operation, the electronic device may display the associated interface of the target point of interest shown in FIG. 10(a). The user may browse the information about the target point of interest on the interface, or may manually upload the target image on the interface. In response to a fourth operation of the user, the electronic device may display a sharing editing interface corresponding to the associated interface of the target point of interest. The fourth operation may be a tap operation performed on a "Write a comment" control on the interface shown in FIG. 10(a). As shown in FIG. 10(b), the sharing editing interface may include a text editing area and an image area. The user may enter to-be-shared text content on the sharing editing interface, and select a to-be-shared target image. In response to a fifth operation of the user, the electronic device may share the target image on the associated interface of the target point of interest. The fifth operation may be a tap operation performed on a "Post" control on the interface shown in FIG. 10(b).

For another example, as shown in FIG. 10(b), the target interface may alternatively be a sharing editing interface corresponding to the associated interface of the target point of interest. In response to the third operation, the electronic device may display the sharing editing interface corresponding to the associated interface of the target point of interest shown in FIG. 10(b). The sharing editing interface may include a text editing area and an image area. When displaying the sharing editing interface, the electronic device may directly display the target image in the image area, so that the user does not need to manually select the target image, and the user can conveniently share the target image. In response to a fifth operation of the user, the electronic device may share the target image on the associated interface of the target point of interest. The fifth operation may be a tap operation performed on a "Post" control on the interface shown in FIG. 10(b).

Figure 11:
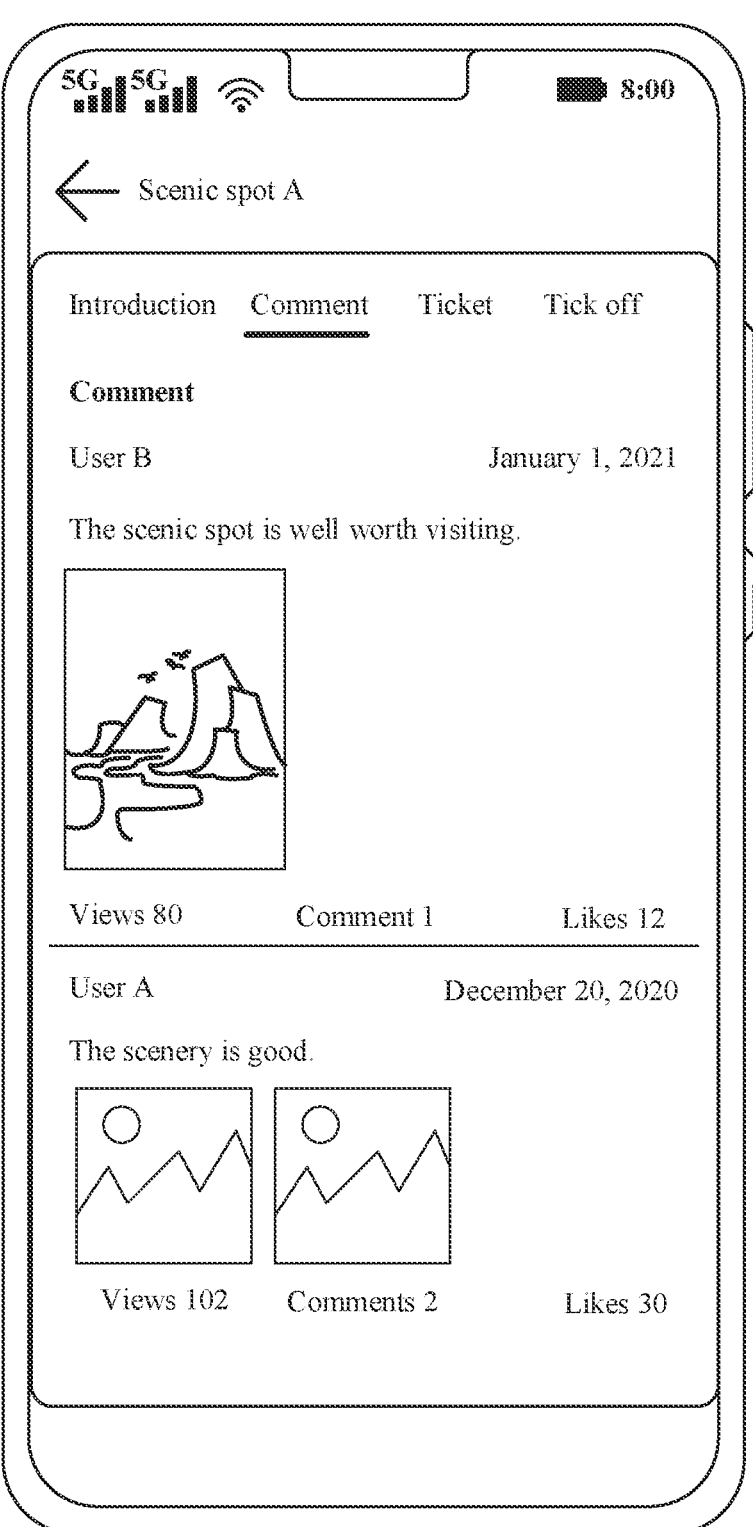
FIG. 11 is a schematic diagram of an associated interface of a target point of interest after a target image is posted according to an embodiment of this application.

FIG. 11 is a schematic diagram of an associated interface of a target point of interest after a target image is posted according to an embodiment of this application. As shown in FIG. 11, it is assumed that the user is User B. After User B taps the "Post" control, the associated interface of the target point of interest displayed on the electronic device includes the target image and text content that are shared by User B. Another user may view, on the associated interface of the target point of interest, the target image and the text content that are shared by User B, and the another user may further trigger an operation like commenting or like giving on the target image.

S505: The electronic device obtains exchanged data corresponding to the target image on the associated interface of the target point of interest, and the electronic device displays the target image, and displays, on the target image, the exchanged data corresponding to the target image.

In some embodiments of this application, after the user posts the target image on the associated interface of the target point of interest, the electronic device may obtain the exchanged data corresponding to the target image on the associated interface of the target point of interest. The exchanged data may be data corresponding to the operation like commenting or like giving, that is triggered by another user on the target image in the target application. When the electronic device displays the target image in the album application, the electronic device may display, on the target image, the exchanged data corresponding to the target image, so that the user can view, without a need to start the target application, exchanged information such as a comment or a like of the another user on the target image when browsing the target image, to improve user experience.

Figure 12:
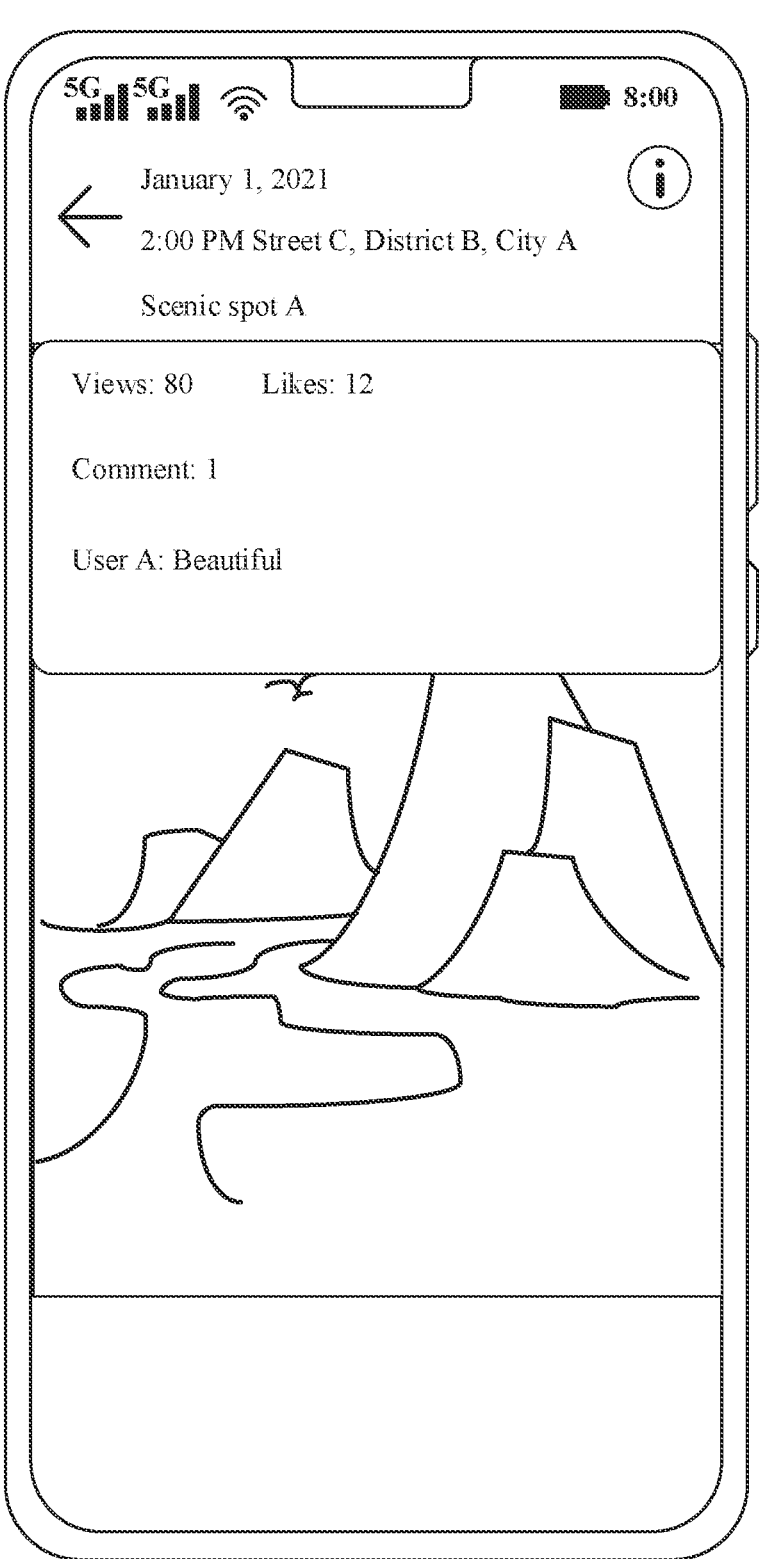
FIG. 12 is a schematic diagram of displaying a target image according to an embodiment of this application.

For example, FIG. 12 is a schematic diagram of displaying a target image according to an embodiment of this application. As shown in FIG. 12, the electronic device may set a suspend box on the target image, and display the exchanged data corresponding to the target image in the suspend box. As shown in FIG. 12, the exchanged data of the target image is that a quantity of views of the target image is 80, 12 likes are made by other users on the target image, one comment is made on the target image, and the comment on the target image is "Beautiful".

It may be understood that the another user in the target application may perform the operation like giving a like or commenting on the target image at any time. To ensure accuracy of the exchanged data corresponding to the target image, the target application in the electronic device may detect the exchanged data corresponding to the target image.

Optionally, after the user posts the target image to the target application, the target application detects that exchanged data of the target image changes, for example, when a quantity of views, a quantity of likes, a quantity of or comments for the target image in the target application changes, the target application may obtain a user account and image information (for example, an image identifier) of the target image, and send the user account and the image information of the target image to the album application. The album application may determine a storage location of the target image in the album application based on the user account of the target application and the image information of the target image. The album application searches, based on the storage location of the target image in the album application, whether the target image exists. When the album application determines that the target image exists, the album application may use updated exchanged data corresponding to the target image as extension information of the target image, and store the extension information of the target image, so that accurate exchanged data is displayed on the target image when the target image is displayed.

Figures 13A, 13B:
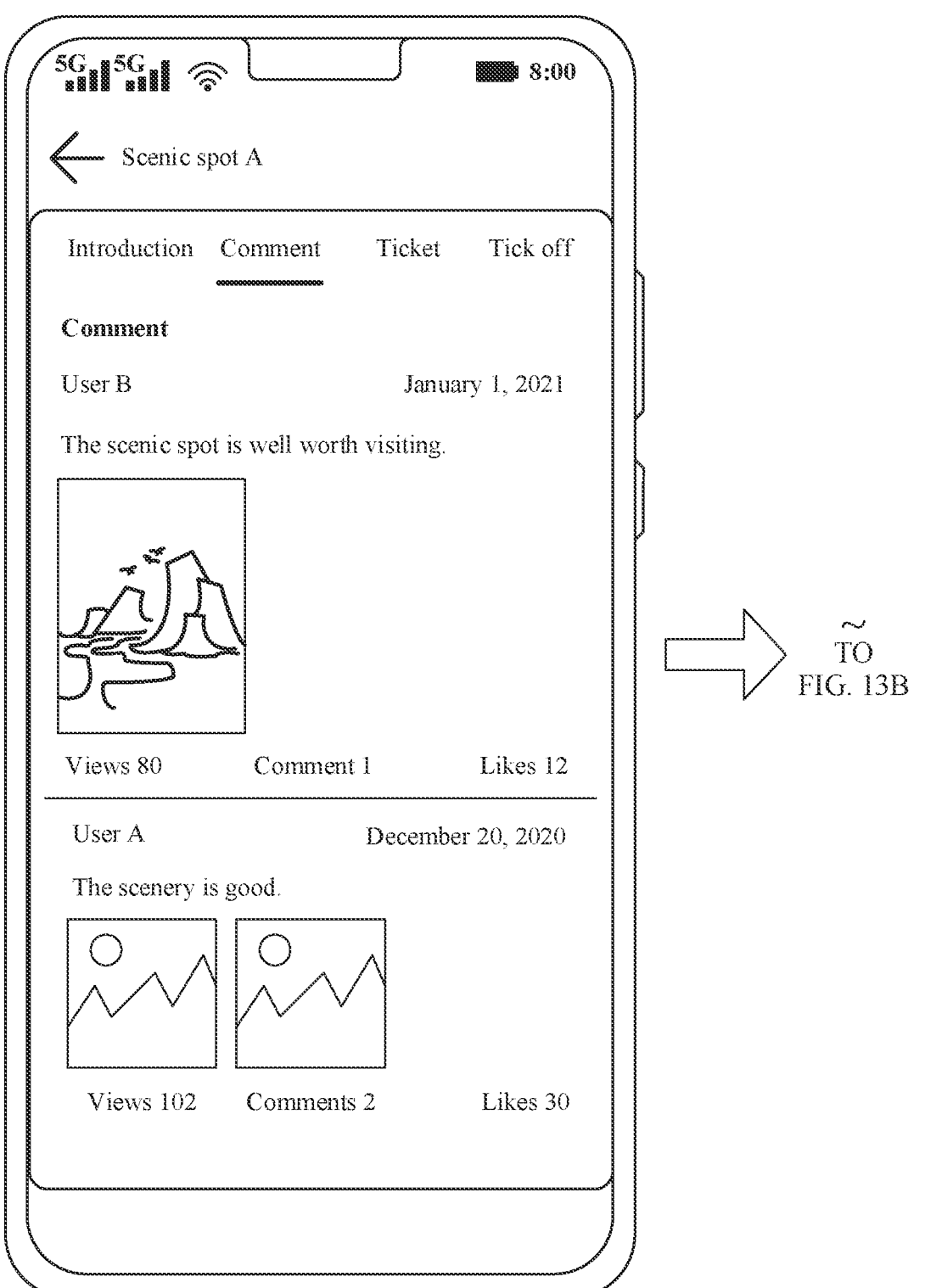
FIG. 13A to FIG. 13C are a schematic diagram of an interface of a change of exchanged data according to an embodiment of this application.
Figures 13A, 13B, 13C:
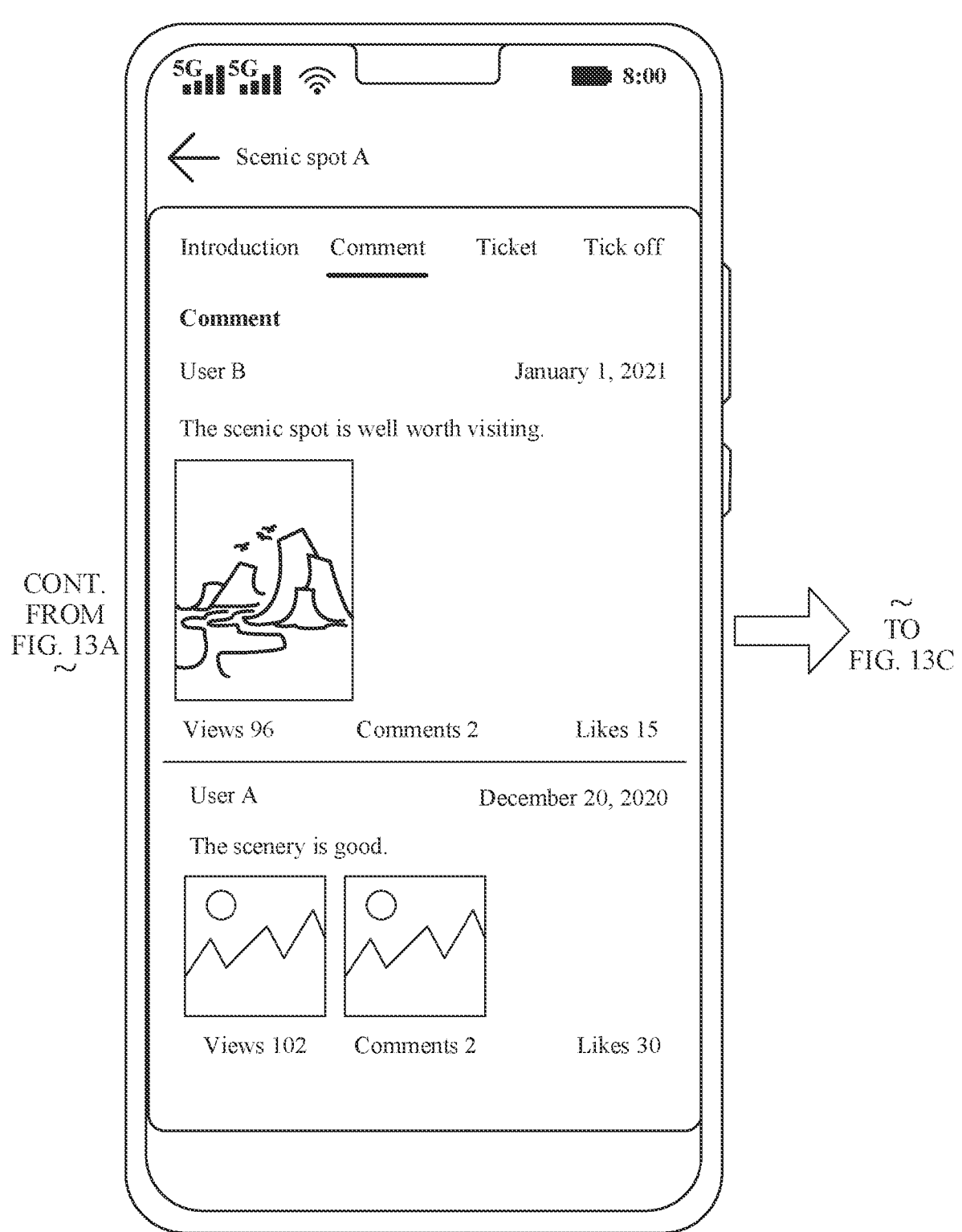
Figure 13C:
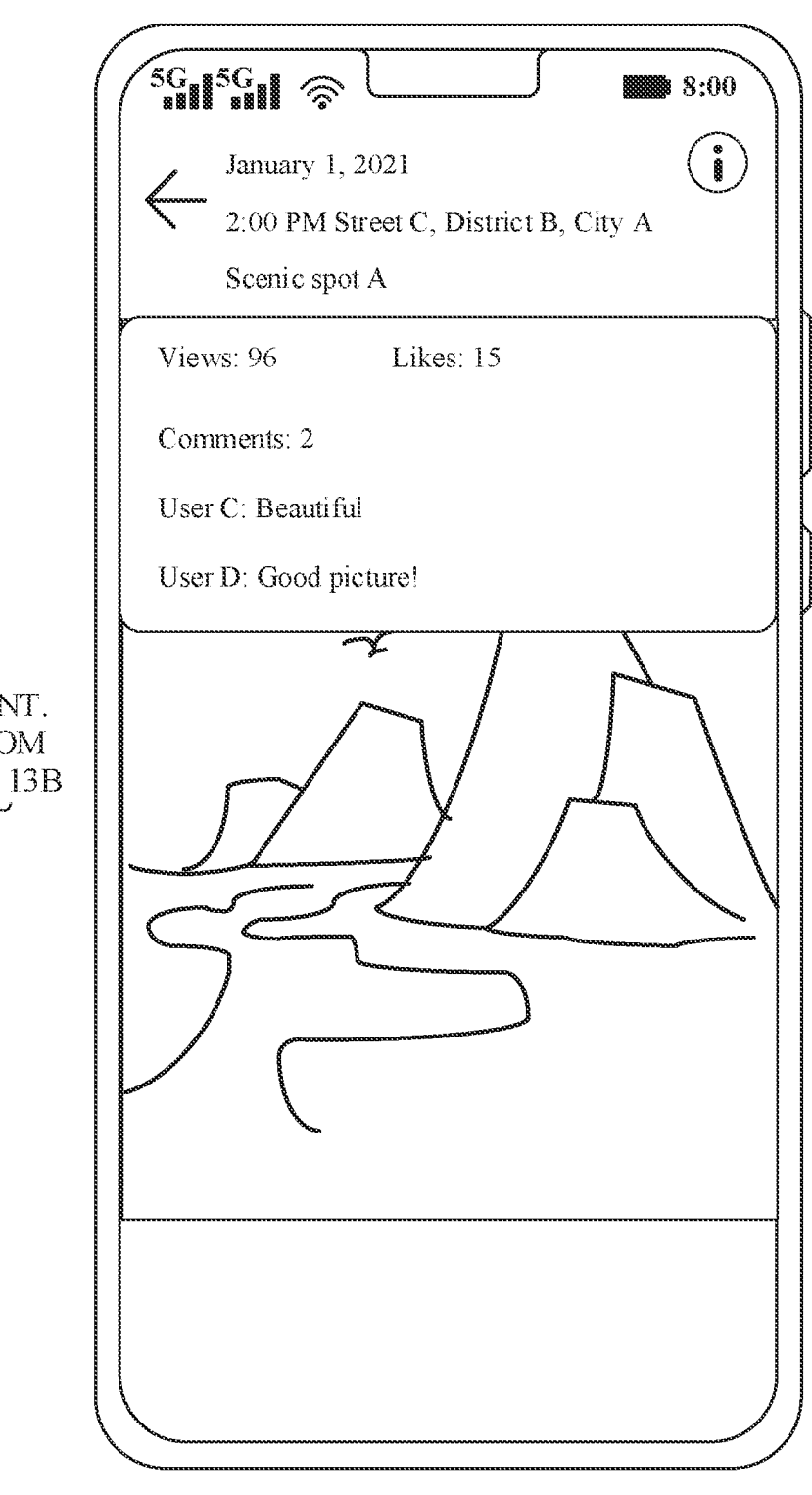

For example, FIG. 13A to FIG. 13C are a schematic diagram of an interface of a change of exchanged data according to an embodiment of this application. As shown in FIG. 13A to FIG. 13C, the quantity of views of the image in the target application changes from 80 to 96, the quantity of likes changes from 12 to 15, and the quantity of comments changes from 1 to 2. After obtaining changed exchanged data, the album application may display the changed exchanged data on the target image in the album.

Figure 14:
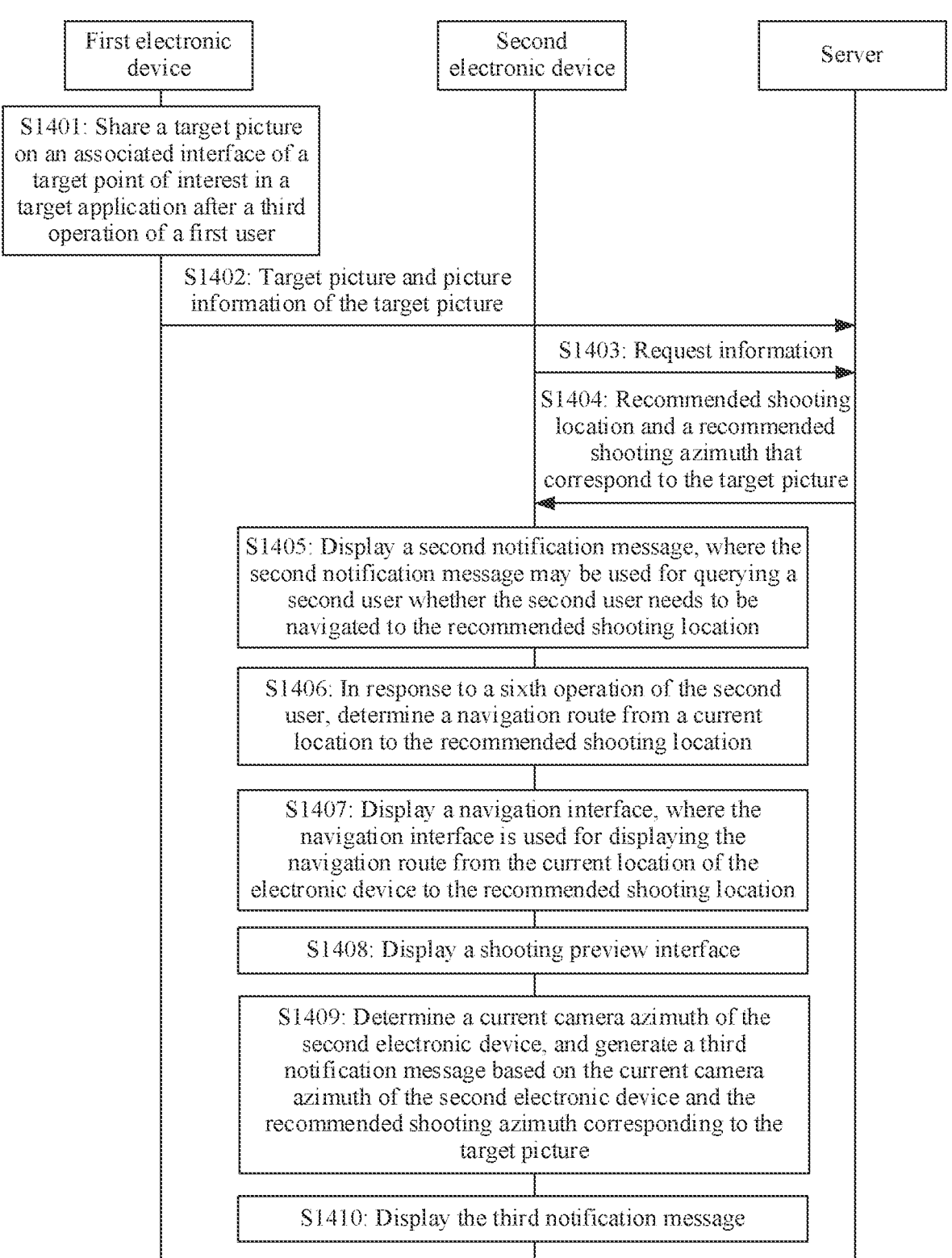
FIG. 14 is a flowchart in which an electronic device performs recommending and guiding on shooting of a user according to an embodiment of this application.

In some scenarios of this application, the electronic device may further recommend a shooting location to the user, and navigate to the recommended shooting location for the user, to indicate the user to perform shooting. FIG. 14 is a flowchart in which an electronic device performs recommending and guiding on shooting of a user according to an embodiment of this application. As shown in FIG. 14, in this example, an electronic device used by a first user is a first electronic device, and an electronic device used by a second user is a second electronic device. The example includes the following steps.

S1401: The first electronic device shares a target image on an associated interface of a target point of interest in a target application after a third operation of the first user.

S1402: The first electronic device sends the target image and image information of the target image to a server of the target application.

The image information of the target image may include a recommended shooting location corresponding to the target image and a recommended shooting azimuth corresponding to the target image. The recommended shooting location corresponding to the target image may be a location at which the electronic device is used to shoot the target image, and the recommended shooting azimuth corresponding to the target image may be an azimuth at which the electronic device is used to shoot the target image.

S1403: In response to a seventh operation of the second user, the second electronic device sends request information to the server.

Figure 15:
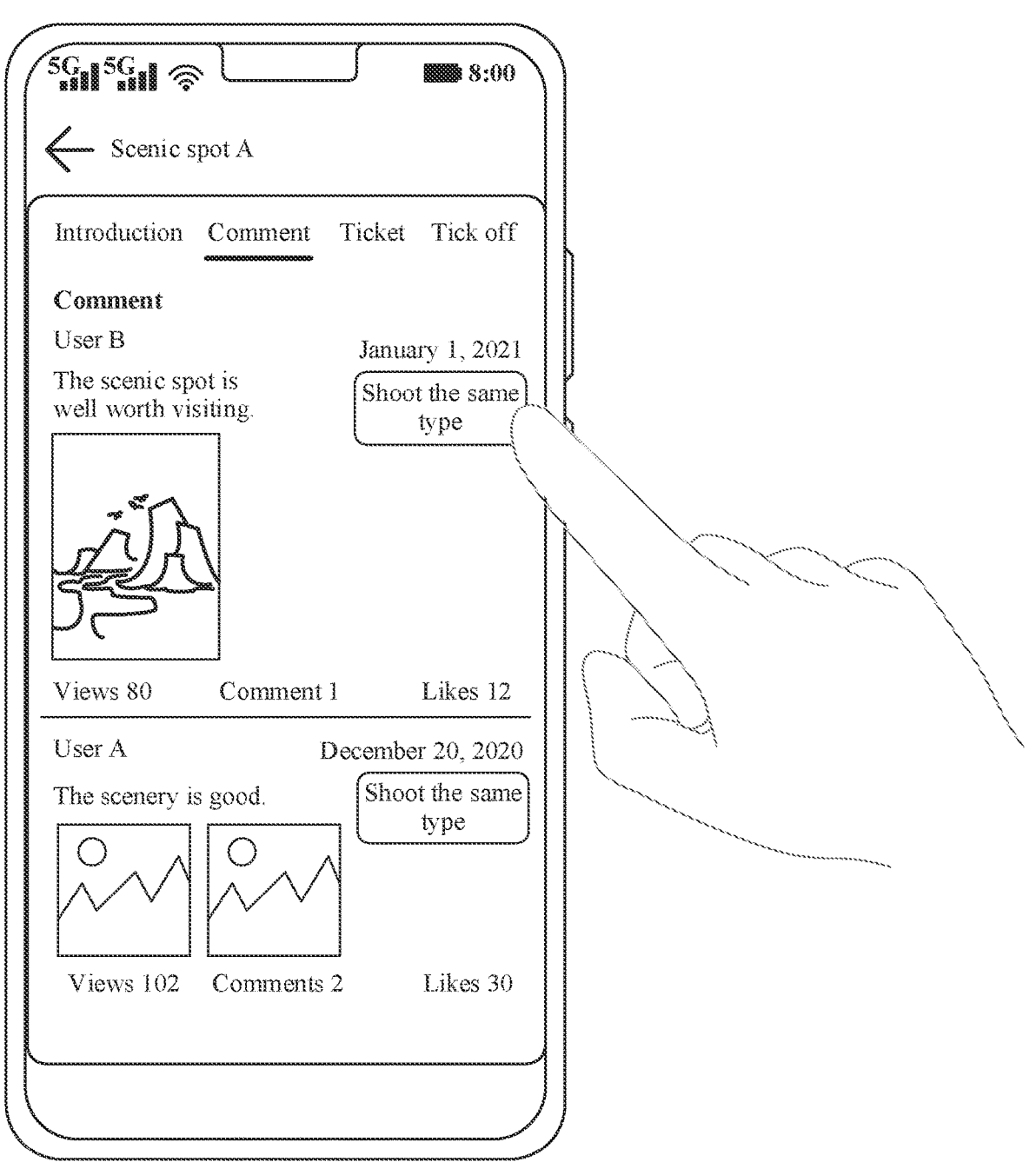
FIG. 15 is a schematic diagram of displaying a target image on an associated interface of a target point of interest according to an embodiment of this application.

After the first user shares the target image on the associated interface of the target point of interest in the target application, when browsing the target image in the target application, another user may choose to shoot an image of a "Same type" of the target image. For example, FIG. 15 is a schematic diagram of displaying a target image on an associated interface of a target point of interest according to an embodiment of this application. When browsing the target image on the associated interface of the target point of interest of the target application on the second electronic device, the second user may trigger the seventh operation. For example, the seventh operation may be a tap operation performed on a "Shoot the same type" control. The second electronic device may send the request information to the server of the target application, where the request information may include an identifier of the target image, and the request information may be used for requesting, from the server, the recommended shooting location and the recommended shooting azimuth that correspond to the target image.

S1404: The server sends, to the second electronic device, the recommended shooting location and the recommended shooting azimuth that correspond to the target image.

After receiving the request information sent by the second electronic device, the server may obtain, based on the identifier of the target image in the request information, the recommended shooting location corresponding to the target image, and send, to the second electronic device, the recommended shooting location corresponding to the target image.

S1405: The second electronic device displays a second notification message, where the second notification message may be used for querying the second user whether the second user needs to be navigated to the recommended shooting location.

Figure 16:
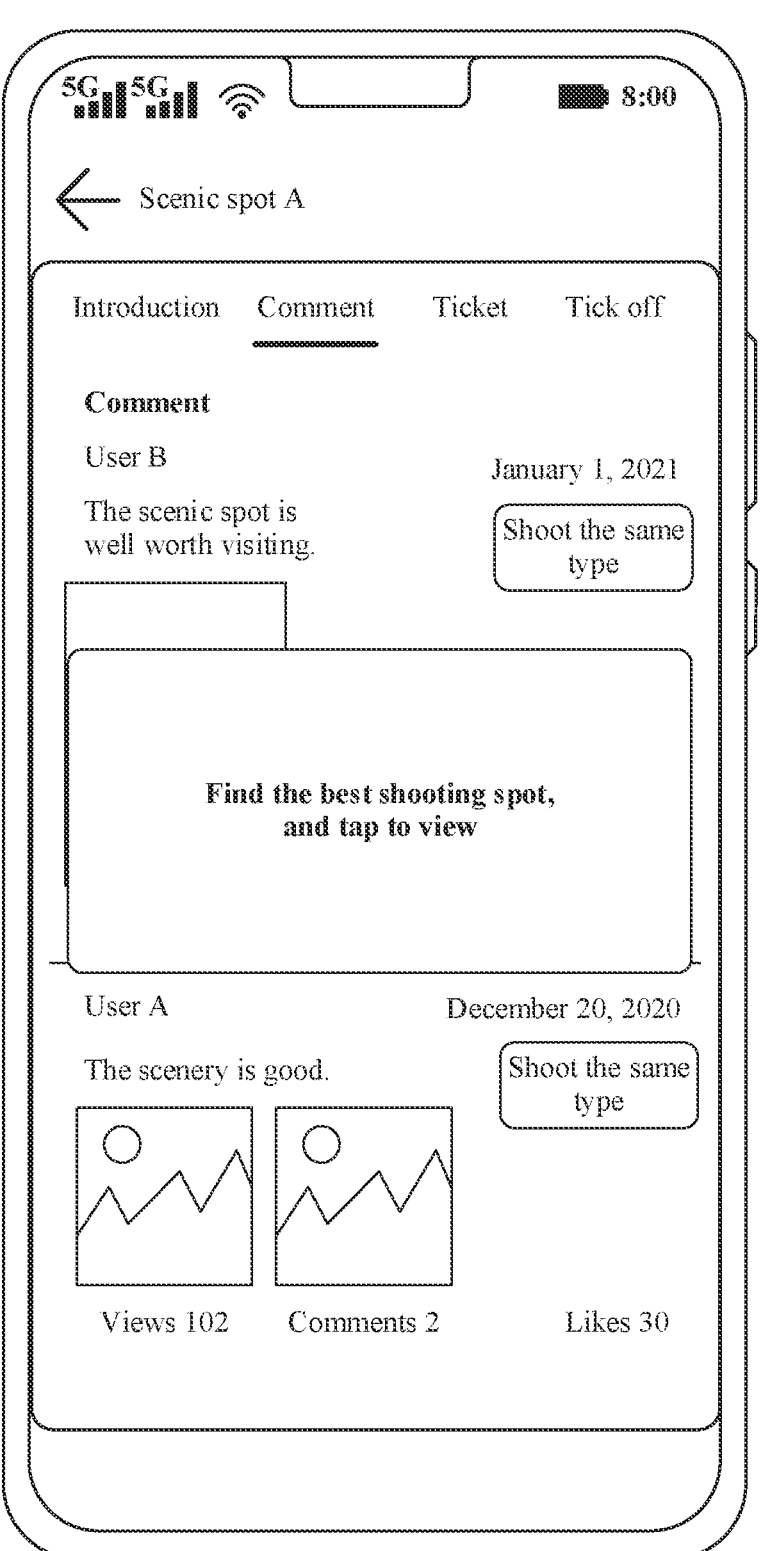
FIG. 16 is a schematic diagram of an interface for displaying a second notification message according to an embodiment of this application.

For example, FIG. 16 is a schematic diagram of an interface for displaying a second notification message according to an embodiment of this application. As shown in FIG. 16, the second electronic device may display the second notification message on a current interface. As shown in FIG. 16, the second notification message is "Find the best shooting spot, and tap to view".

Figure 17:
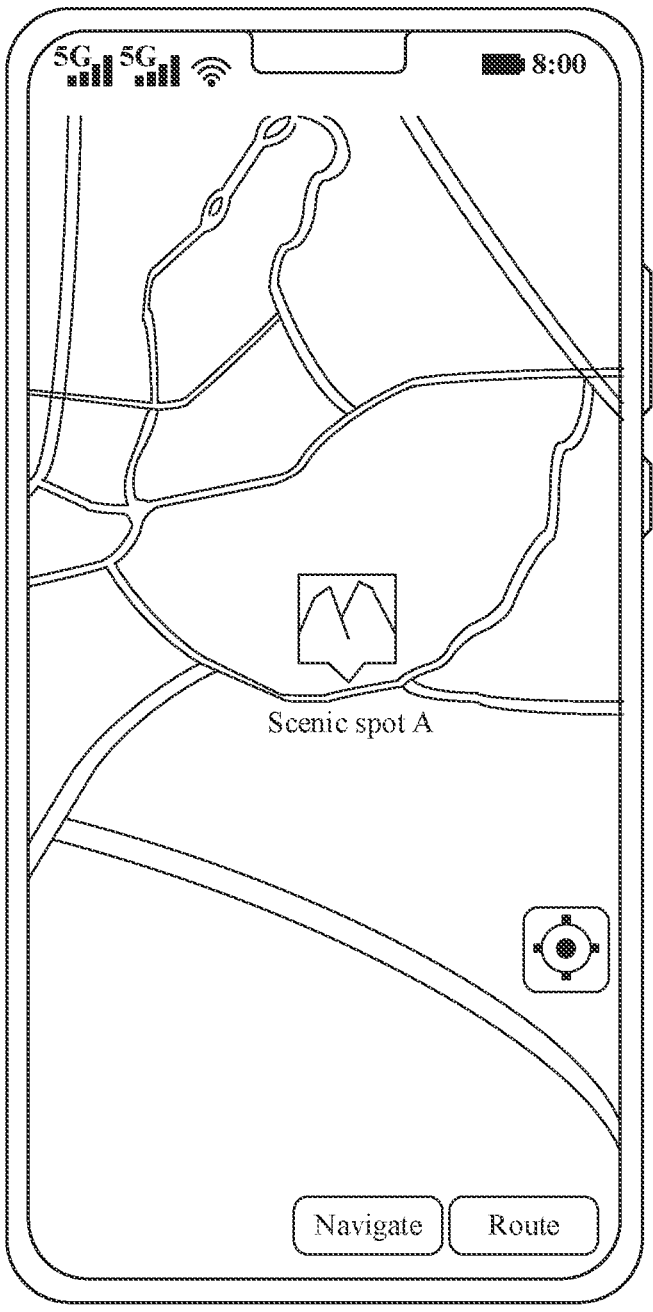
FIG. 17 is a schematic diagram of displaying a recommended shooting location on a map according to an embodiment of this application.

After the second user taps the second notification message, the second electronic device may display a map interface, and display, on the map interface, an identifier of the recommended shooting location. The identifier of the recommended shooting location may be a name and/or an image of the recommended shooting location. FIG. 17 is a schematic diagram of displaying a recommended shooting location on a map according to an embodiment of this application. As shown in FIG. 17, the second electronic device may display the map interface, and display, on the map interface, the name and the image of the recommended shooting location.

S1406: In response to a sixth operation of the second user, determine a navigation route from a current location of the second electronic device to the recommended shooting location.

Optionally, the sixth operation may be a tap operation performed on a navigation control. For example, the user may tap the navigation control on the interface shown in FIG. 17, to trigger the sixth operation.

In an optional implementation, the electronic device may obtain geographical coordinates of the recommended shooting location, and determine the navigation route based on geographical coordinates of the current location of the electronic device and the geographical coordinates of the recommended shooting location.

S1407: The second electronic device displays a navigation interface, where the navigation interface is used for displaying the navigation route from the current location of the electronic device to the recommended shooting location.

The second electronic device may display the navigation route from the current location of the electronic device to the recommended shooting location, and the second user can hold the second electronic device to move according to the navigation route, to arrive at the recommended shooting location.

S1408: The second electronic device displays a shooting preview interface.

In this embodiment of this application, after the electronic device determines that the user arrives at the recommended shooting location, the electronic device may switch, from the navigation interface, to display the shooting preview interface of a camera application.

S1409: The second electronic device determines a current camera azimuth of the second electronic device, and generates a third notification message based on the current camera azimuth of the second electronic device and the recommended shooting azimuth corresponding to the target image.

S1410: The second electronic device displays the third notification message.

The third notification message may be used for prompting the second user to adjust a shooting azimuth of the second electronic device.

In this embodiment of this application, when the second electronic device displays the shooting preview interface, the second electronic device may generate the third notification message based on the recommended shooting azimuth corresponding to the target image and the current camera azimuth of the electronic device, to prompt the user to adjust the shooting azimuth of the electronic device, so as to guide shooting of the user.

Figure 18:
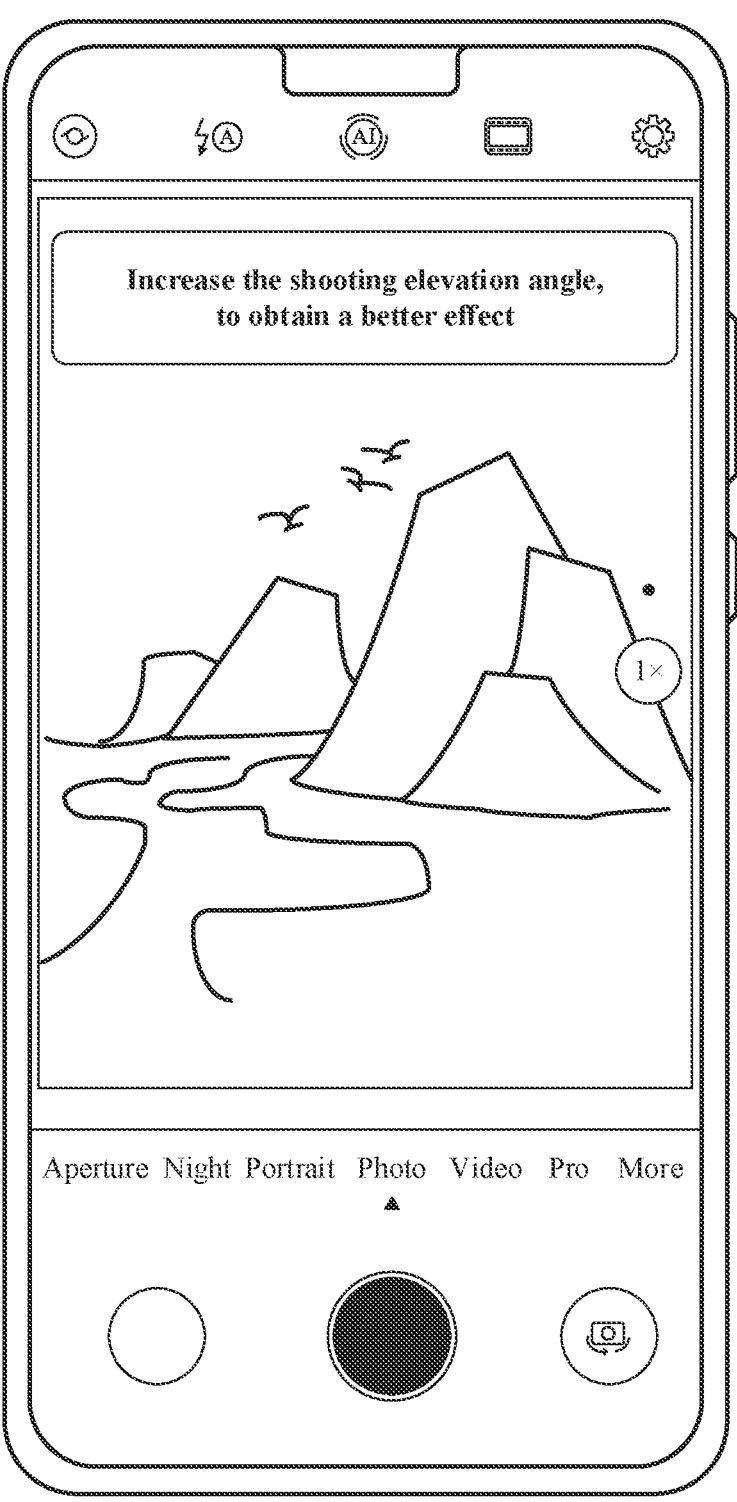
FIG. 18 is a schematic diagram of displaying a third notification message according to an embodiment of this application.

For example, FIG. 18 is a schematic diagram of displaying a third notification message according to an embodiment of this application. As shown in FIG. 18, the electronic device displays the third notification message on the shooting preview interface, and the third notification message may be "Increase the shooting elevation angle, to obtain a better effect".

It should be noted that, in this embodiment of this application, the server of the target application may further determine, based on related information of images sent by a plurality of users on the associated interface of the target point of interest, a recommended shooting location and a recommended shooting azimuth that correspond to the target point of interest. Optionally, the associated interface of the target point of interest includes comment information that is associated with the target point of interest and that is shared by the plurality of users, and the comment information may include content such as a text or an image. The related information of the image shared by each user may include at least one of a quantity of likes, a quantity of views, a quantity of comments, a shooting time, and a weather condition of the image. The server may determine a popular image on the associated interface of the target point of interest based on the related information of the image, and use a recommended shooting location and a recommended shooting azimuth that correspond to the image as the recommended shooting location and the recommended shooting azimuth of the target point of interest respectively.

Figure 19:
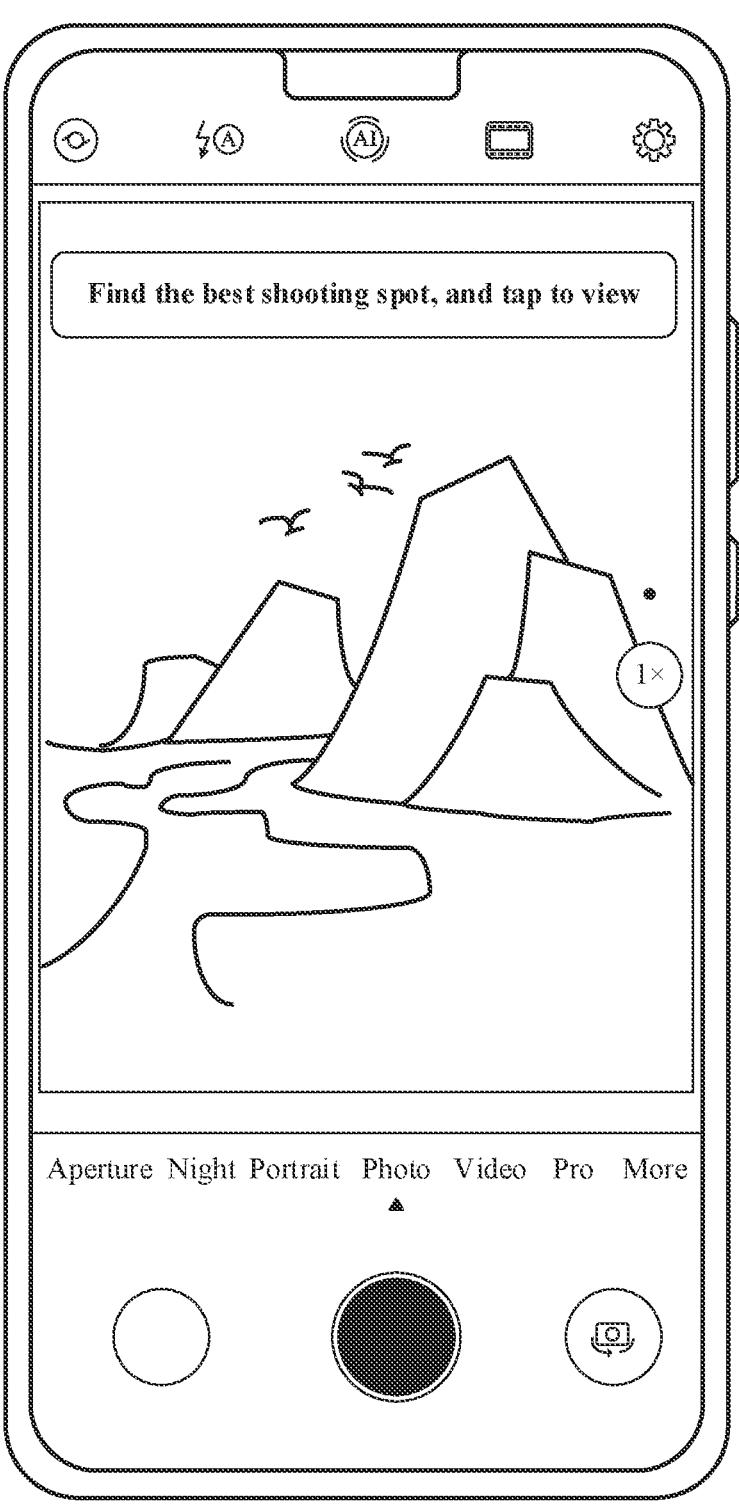
FIG. 19 is a schematic diagram of a shooting preview interface according to an embodiment of this application.

For example, when the second electronic device displays the shooting preview interface, after the second electronic device determines the target point of interest, the server may send, to the second electronic device, the recommended shooting location and the recommended shooting azimuth that correspond to the target point of interest, and the second electronic device may display the second notification message on the preview display interface. FIG. 19 is a schematic diagram of a shooting preview interface according to an embodiment of this application. The second electronic device may display the second notification message on the shooting preview interface. As shown in FIG. 19, the second notification message is "Find the best shooting spot, and tap to view". The second electronic device may indicate the second user to perform shooting based on the recommended shooting location and the recommended shooting azimuth that correspond to the target point of interest and that are determined by the server. For a specific implementation, refer to S1405 to S1410 in the embodiment shown in FIG. 14. Repeated content is not described again.

Figure 20:
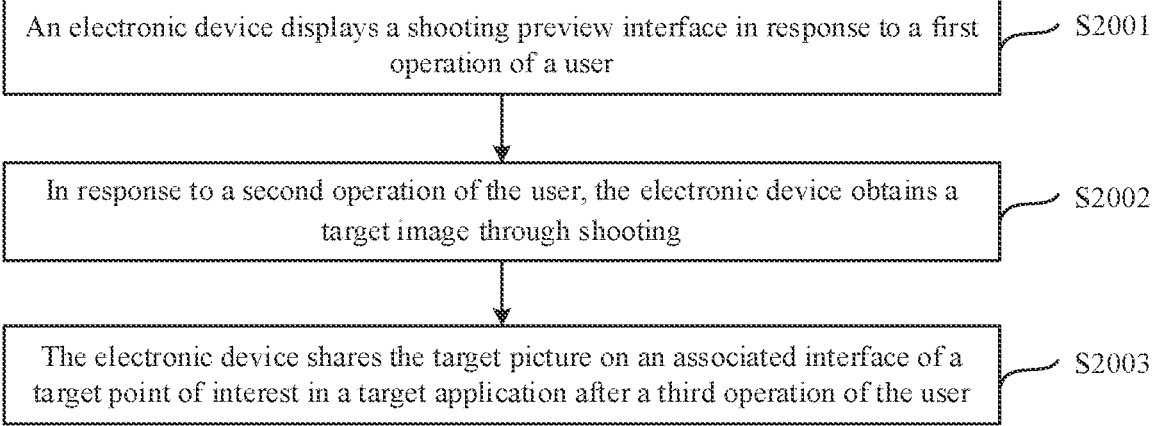
FIG. 20 is a flowchart of an image shooting and sharing method according to an embodiment of this application.

Based on the foregoing embodiments, this application further provides an image shooting and sharing method. The method may be performed by an electronic device. FIG. 20 is a flowchart of an image shooting and sharing method according to an embodiment of this application. As shown in FIG. 20, the method includes the following steps:

S2001: An electronic device displays a shooting preview interface in response to a first operation of a user.

The shooting preview interface includes information about a target point of interest, and the target point of interest is a point of interest corresponding to a current location of the electronic device.

S2002: In response to a second operation of the user, the electronic device obtains a target image through shooting.

Image information of the target image includes a part or all of the information about the target point of interest.

S2003: The electronic device shares the target image on an associated interface of the target point of interest in a target application after a third operation of the user.

It should be noted that, for a specific implementation of the image shooting and sharing method shown in FIG. 20 in this application, refer to the foregoing embodiments of this application. Repeated content is not described again.

Based on the foregoing embodiments, this application further provides an electronic device. The electronic device includes a plurality of functional modules. The plurality of functional modules interact with each other, to implement the methods described in embodiments of this application. The plurality of functional modules may be implemented based on software, hardware, or a combination of software and hardware, and the plurality of functional modules may be randomly combined or divided based on a specific implementation.

Based on the foregoing embodiments, this application further provides an electronic device. The electronic device includes at least one processor and at least one memory. The at least one memory stores computer program instructions. When the electronic device runs, the at least one processor performs the methods described in embodiments of this application.

Based on the foregoing embodiments, this application further provides a computer program. When the computer program is run on a computer, the computer is enabled to perform the methods described in embodiments of this application.

Based on the foregoing embodiments, this application further provides a computer-readable storage medium. The computer-readable storage medium stores a computer program. When the computer program is executed by a computer, the computer is enabled to perform the methods described in embodiments of this application.

Based on the foregoing embodiments, this application further provides a chip. The chip is configured to read a computer program stored in a memory, to implement the methods described in embodiments of this application.

Based on the foregoing embodiments, this application provides a chip system. The chip system includes a processor, configured to support a computer apparatus in implementing the methods described in embodiments of this application. In a possible design, the chip system further includes a memory. The memory is configured to store a program and data that are necessary for the computer apparatus. The chip system may include a chip, or may include a chip and another discrete component.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims of this application and their equivalent technologies.

What is claimed is:

1. A method comprising:

displaying a shooting preview interface of an electronic device in response to a first operation of a user, wherein the shooting preview interface comprises first point of interest information about a target point of interest, and wherein the target point of interest corresponds to a current location of the electronic device;

capturing, in response to a second operation of the user, a target image using a shooting function of a camera of the electronic device;

adding to image information of the target image a part or all of the first point of interest information;

selecting a target application from a plurality of applications based on use frequency or user selection;

sharing, in response to a third operation of the user, the target image on an associated interface of the target point of interest in the target application;

receiving a recommended shooting location that corresponds to the target point of interest from a server of the target application;

displaying the recommended shooting location in the shooting preview interface;

obtaining, in response to a fourth operation of the user, a navigation route from the current location to the recommended shooting location; and displaying a navigation interface for displaying the navigation route.

2. The method according to claim 1, wherein before displaying the shooting preview interface, the method further comprises:

obtaining the current location; and obtaining the target point of interest based on the current location and a preset correspondence between a location and a point of interest, or obtaining an image captured by the camera at the current location and performing image recognition on the image to obtain the target point of interest.

3. The method according to claim 1, wherein the first point of interest information comprises at least one of a name of the target point of interest, a location of the target point of interest, a direction of the target point of interest relative to the current location, a distance between the target point of interest and the current location, a point of interest type of the target point of interest, contact information of the target point of interest, or image content of the target point of interest.

4. The method according to claim 1, wherein before detecting the third operation, the method further comprises:

detecting sensitive information in the target image; and displaying a notification message for querying the user whether to share the target image with the target application.

5. The method according to claim 1, wherein sharing the target image on the associated interface comprises:

displaying, in response to the third operation, the associated interface;

displaying, in response to a fifth operation of the user, a sharing editing interface corresponding to the associated interface; and sharing, in response to a sixth operation of the user, the target image on the associated interface.

6. The method according to claim 1, wherein the associated interface comprises at least one piece of comment information that is associated with the target point of interest and that is shared by the user, and wherein the comment information comprises the target image.

7. The method according to claim 1, wherein after sharing the target image, the method further comprises:

obtaining exchanged data corresponding to the target image, wherein the exchanged data corresponds to an exchanging operation from another user on the target image in the target application;

displaying the target image in an album application; and displaying, on the target image.

8. The method according to claim 7, wherein the exchanged data comprises at least one of data corresponding to a browse operation, data corresponding to a comment operation, or data corresponding to a like giving operation from another user on the target image in the target application.

9. The method according to claim 1, wherein the method further comprising:

displaying the associated interface; and obtaining, in response to a fifth operation of the user on a first image, second point of interest information of the first image when the associated interface is displayed, wherein receiving the recommended shooting location comprises receiving the recommended shooting location based on the second point of interest information, and wherein obtaining the navigation route comprises obtaining, in further response to a sixth operation of the user, the navigation route.

10. The method according to claim 1, further comprising:
obtaining a recommended shooting azimuth;
obtaining a current camera azimuth of the electronic device;
generating a notification message based on the current camera azimuth and the recommended shooting azimuth, wherein the notification message prompts the user to adjust a shooting azimuth of the electronic device; and
displaying the notification message.

11. An electronic device comprising:
at least one memory configured to store instructions; and
at least one processor coupled to the at least one memory and configured to execute the instructions to cause the electronic device to be configured to:
display a shooting preview interface in response to a first operation of a user, wherein the shooting preview interface comprises first point of interest information about a target point of interest, and wherein the target point of interest corresponds to a current location of the electronic device;
capture, in response to a second operation of the user, a target image using a shooting function of a camera of the electronic device;
add to image information of the target image a part or all of the first point of interest information;
select a target application from a plurality of applications based on use frequency or user selection;
share, in response to a third operation of the user, the target image on an associated interface of the target point of interest in the target application;
receive a recommended shooting location that corresponds to the target point of interest from a server of the target application;
display the recommended shooting location in the shooting preview interface;
obtain, in response to a fourth operation of the user, a navigation route from the current location to the recommended shooting location; and
display a navigation interface for displaying the navigation route.

12. The electronic device according to claim 11, wherein before displaying the shooting preview interface, the instructions when executed by the at least one processor cause the electronic device to be further configured to:
obtain the current location; and
obtain the target point of interest based on the current location and a preset correspondence between a location and a point of interest, or obtain an image captured by the camera at the current location and perform image recognition on the image to obtain the target point of interest.

13. The electronic device according to claim 11, wherein the first point of interest information comprises at least one of a name of the target point of interest, a location of the target point of interest, a direction of the target point of interest relative to the current location, a distance between the target point of interest and the current location, a point of interest type of the target point of interest, contact information of the target point of interest, or image content of the target point of interest.

14. The electronic device according to claim 11, wherein before detecting the third operation, the instructions when executed by the at least one processor cause the electronic device to be further configured to:
detect sensitive information in the target image; and
display a notification message for querying the user whether to share the target image with the target application.

15. The electronic device according to claim 11, wherein the instructions when executed by the at least one processor cause the electronic device to be further configured to:
display, in response to the third operation of the user, a sharing editing interface corresponding to the associated interface; and
share, in response to a sixth operation of the user, the target image on the associated interface.

16. The electronic device according to claim 11, wherein the associated interface comprises at least one piece of comment information that is associated with the target point of interest and that is shared by the user, and wherein the comment information comprises the target image.

17. The electronic device according to claim 11, wherein after sharing the target image, the instructions when executed by the at least one processor cause the electronic device to be further configured to:
obtain exchanged data corresponding to the target image, wherein the exchanged data corresponds to an exchanging operation from another user on the target image in the target application;
display the target image in an album application; and
display, on the target image, the exchanged data.

18. The electronic device according to claim 17, wherein the exchanged data comprises at least one of data corresponding to a browse operation, data corresponding to a comment operation, or data corresponding to a like giving operation from another user on the target image in the target application.

19. A computer program product comprising computer-executable instructions stored on a non-transitory computer-readable medium that, when executed by a processor, cause an electronic device to:
display a shooting preview interface of the electronic device in response to a first operation of a user, wherein the shooting preview interface comprises first point of interest information about a target point of interest, and wherein the target point of interest corresponds to a current location of the electronic device;
capture, in response to a second operation of the user, a target image using a shooting function of a camera of the electronic device;
add to image information of the target image a part or all of the first point of interest information;
select a target application from a plurality of applications based on use frequency or user selection;
share, in response to a third operation of the user, the target image on an associated interface of the target point of interest in the target application;
receive a recommended shooting location that corresponds to the target point of interest from a server of the target application;
display the recommended shooting location in the shooting preview interface;
obtain, in response to a fourth operation of the user, a navigation route from the current location to the recommended shooting location; and display a navigation interface for displaying the navigation route.

20. The computer program product according to claim 19, wherein the computer-executable instructions, when executed by the processor, further cause the electronic device to:

obtain a recommended shooting azimuth;

obtain a current camera azimuth of the electronic device;

generate a notification message based on the current camera azimuth and the recommended shooting azimuth, wherein the notification message prompts the user to adjust a shooting azimuth of the electronic device; and display the notification message.

* * * * *